United States Patent
Goldberg et al.

(10) Patent No.: US 11,562,000 B2
(45) Date of Patent: *Jan. 24, 2023

(54) STORAGE CONSTRAINED SYNCHRONIZATION ENGINE

(71) Applicant: Dropbox, Inc., San Francisco, CA (US)

(72) Inventors: Isaac Goldberg, San Francisco, CA (US); Benjamin Zeis Newhouse, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 376 days.

This patent is subject to a terminal disclaimer.

(21) Appl. No.: 16/887,317

(22) Filed: May 29, 2020

(65) Prior Publication Data
US 2020/0293546 A1  Sep. 17, 2020

Related U.S. Application Data

(63) Continuation of application No. 15/420,014, filed on Jan. 30, 2017, now Pat. No. 10,719,532.
(Continued)

(51) Int. Cl.
*G06F 16/27* (2019.01)
*G06F 16/23* (2019.01)
(Continued)

(52) U.S. Cl.
CPC ............ *G06F 16/27* (2019.01); *G06F 16/178* (2019.01); *G06F 16/1734* (2019.01);
(Continued)

(58) Field of Classification Search
CPC ...... G06F 16/27; G06F 16/2379; G06F 16/23; G06F 16/2308; G06F 16/1787;
(Continued)

(56) References Cited

U.S. PATENT DOCUMENTS 7,257,689 B1  8/2007  Baird et al.
7,383,466 B2  6/2008  Kusters et al.
(Continued)

FOREIGN PATENT DOCUMENTS

CN  101288074 A  10/2008
CN  101398850 A  4/2009
(Continued)

OTHER PUBLICATIONS

Chen Y., "Information Valuation for information Lifecycle Management," Proceedings of the Second International Conference on Autonomic Computing (ICAC'05), Jun. 13-16, 2005, pp. 135-146.
(Continued)

*Primary Examiner* — Hosain T Alam
*Assistant Examiner* — Nicholas E Allen
(74) *Attorney, Agent, or Firm* — Fenwick & West LLP

(57) ABSTRACT

A client application of a content management system provides instructions for synchronizing content items and placeholder items using a local file journal and updated file journal. The client application compares entries in the updated file journal to entries in the local file journal to determine modifications to make to content items or placeholder items stored in a shared content storage directory on the client device. Based on the result of the comparison, the client application replaces placeholder items with content items or replaces content items with placeholder items.

20 Claims, 22 Drawing Sheets

Related U.S. Application Data

(60) Provisional application No. 62/327,379, filed on Apr. 25, 2016.

(51) Int. Cl.
*G06F 16/178* (2019.01)
*G06F 16/17* (2019.01)

(52) U.S. Cl.
CPC .......... *G06F 16/1787* (2019.01); *G06F 16/23* (2019.01); *G06F 16/235* (2019.01); *G06F 16/2308* (2019.01); *G06F 16/2358* (2019.01); *G06F 16/2379* (2019.01)

(58) Field of Classification Search
CPC .. G06F 16/235; G06F 16/178; G06F 16/2358; G06F 16/1734
USPC ......................................................... 707/634
See application file for complete search history.

(56) References Cited

U.S. PATENT DOCUMENTS

| | | | |
|---|---|---|---|
| 7,552,044 | B2 | 6/2009 | Xu et al. |
| 7,720,920 | B2 | 5/2010 | Singh et al. |
| 7,801,896 | B2 | 9/2010 | Szabo |
| 8,019,863 | B2 | 9/2011 | Jeide et al. |
| 8,081,955 | B2 | 12/2011 | Davis et al. |
| 8,200,626 | B1 | 6/2012 | Katzer et al. |
| 8,332,470 | B2 | 12/2012 | Arun et al. |
| 8,335,765 | B2 | 12/2012 | Sivasubramanian et al. |
| 8,352,522 | B1 | 1/2013 | Cheng |
| 8,762,344 | B2 | 6/2014 | Esaka et al. |
| 8,793,573 | B2 | 7/2014 | Beckmann et al. |
| 8,818,941 | B2 | 8/2014 | Kiilerich et al. |
| 8,832,025 | B2 | 9/2014 | Arai et al. |
| 8,862,782 | B2 | 10/2014 | Roberts et al. |
| 8,977,596 | B2 | 3/2015 | Montulli et al. |
| 9,185,164 | B1 | 11/2015 | Newhouse |
| 9,361,349 | B1 | 6/2016 | Newhouse |
| 9,400,800 | B2 | 7/2016 | Jacobson et al. |
| 9,405,767 | B2 | 8/2016 | Novak et al. |
| 9,479,567 | B1 | 10/2016 | Koorapati et al. |
| 9,571,573 | B1 | 2/2017 | Koorapati et al. |
| 9,817,878 | B2 | 11/2017 | Newhouse |
| 9,852,147 | B2 | 12/2017 | Von Muhlen et al. |
| 9,934,241 | B2 | 4/2018 | Duval et al. |
| 9,934,303 | B2 | 4/2018 | Newhouse et al. |
| 10,248,705 | B2 | 4/2019 | Newhouse |
| 2004/0177319 | A1 | 9/2004 | Horn et al. |
| 2006/0100978 | A1 | 5/2006 | Heller et al. |
| 2006/0137010 | A1 | 6/2006 | Kramer et al. |
| 2007/0016621 | A1 | 1/2007 | Havewala et al. |
| 2007/0016754 | A1 | 1/2007 | Testardi et al. |
| 2007/0124374 | A1 | 5/2007 | Arun et al. |
| 2007/0150526 | A1 | 6/2007 | D'Souza et al. |
| 2007/0220220 | A1 | 9/2007 | Ziv et al. |
| 2007/0265935 | A1 | 11/2007 | Woycik et al. |
| 2007/0277010 | A1 | 11/2007 | Anand et al. |
| 2007/0282878 | A1 | 12/2007 | Marshall et al. |
| 2008/0028169 | A1 | 1/2008 | Kaplan et al. |
| 2008/0046670 | A1 | 2/2008 | Lam et al. |
| 2008/0104134 | A1 | 5/2008 | Chellappa et al. |
| 2008/0201362 | A1 | 8/2008 | Multer et al. |
| 2008/0228802 | A1 | 9/2008 | Marshall et al. |
| 2008/0256314 | A1 | 10/2008 | Anand et al. |
| 2008/0263227 | A1 | 10/2008 | Roberts et al. |
| 2008/0270596 | A1 | 10/2008 | Wahl |
| 2009/0157802 | A1 | 6/2009 | Kang et al. |
| 2009/0198805 | A1 | 8/2009 | Ben-Shaul et al. |
| 2010/0161759 | A1 | 6/2010 | Brand et al. |
| 2010/0191783 | A1 | 7/2010 | Mason et al. |
| 2010/0332401 | A1 | 12/2010 | Prahlad et al. |
| 2010/0332456 | A1 | 12/2010 | Prahlad et al. |
| 2010/0332818 | A1 | 12/2010 | Prahlad et al. |
| 2011/0040729 | A1 | 2/2011 | Ito et al. |
| 2011/0078112 | A1 | 3/2011 | Takata et al. |
| 2011/0119668 | A1 | 5/2011 | Calder et al. |
| 2011/0202572 | A1 | 8/2011 | Ho et al. |
| 2012/0016838 | A1 | 1/2012 | Arai et al. |
| 2012/0072397 | A1 | 3/2012 | Esaka et al. |
| 2012/0078942 | A1 | 3/2012 | Cai et al. |
| 2012/0151211 | A1 | 6/2012 | Kreiner et al. |
| 2012/0259813 | A1 | 10/2012 | Takata et al. |
| 2013/0151468 | A1 | 6/2013 | Wu et al. |
| 2013/0226876 | A1* | 8/2013 | Gati ...................... G06F 16/184 707/652 |
| 2013/0254660 | A1 | 9/2013 | Fujioka |
| 2013/0305368 | A1 | 11/2013 | Ford |
| 2013/0346557 | A1 | 12/2013 | Chang et al. |
| 2014/0006465 | A1 | 1/2014 | Davis et al. |
| 2014/0040182 | A1 | 2/2014 | Gilder et al. |
| 2014/0181443 | A1 | 6/2014 | Kottomtharayil et al. |
| 2014/0188803 | A1 | 7/2014 | James et al. |
| 2014/0195638 | A1 | 7/2014 | Houston et al. |
| 2014/0229839 | A1 | 8/2014 | Lynch et al. |
| 2014/0289225 | A1 | 9/2014 | Chan |
| 2014/0324776 | A1 | 10/2014 | Novak et al. |
| 2014/0324777 | A1 | 10/2014 | Novak et al. |
| 2014/0330874 | A1 | 11/2014 | Novak et al. |
| 2014/0379647 | A1 | 12/2014 | Smith et al. |
| 2014/0380315 | A1 | 12/2014 | Khajuria et al. |
| 2015/0127679 | A1 | 5/2015 | Wing et al. |
| 2015/0161155 | A1 | 6/2015 | Pletcher et al. |
| 2015/0207844 | A1 | 7/2015 | Tataroiu et al. |
| 2015/0213376 | A1 | 7/2015 | Ideses et al. |
| 2015/0278330 | A1 | 10/2015 | Hawa et al. |
| 2015/0324945 | A1 | 11/2015 | Lord et al. |
| 2015/0373116 | A1* | 12/2015 | Mo ...................... G06F 3/0647 709/219 |
| 2016/0034490 | A1 | 2/2016 | Woo et al. |
| 2016/0063026 | A1 | 3/2016 | Mokhtarzada et al. |
| 2016/0092444 | A1 | 3/2016 | Dornquast et al. |
| 2016/0350322 | A1 | 12/2016 | Fan et al. |
| 2017/0270136 | A1 | 9/2017 | Chen et al. |

FOREIGN PATENT DOCUMENTS

| | | |
|---|---|---|
| CN | 101689174 A | 3/2010 |
| EP | 1452978 A2 | 9/2004 |
| EP | 2652588 A1 | 10/2013 |
| JP | 2002140213 A | 5/2002 |
| JP | 2002244914 A | 8/2002 |
| JP | 2004054633 A | 2/2004 |
| JP | 2004227572 A | 8/2004 |
| JP | 2005505829 A | 2/2005 |
| JP | 2005228242 A | 8/2005 |
| JP | 2007140798 A | 6/2007 |
| JP | 2007249782 A | 9/2007 |
| JP | 2010257094 A | 11/2010 |
| JP | 2011034525 A | 2/2011 |
| JP | 2011076294 A | 4/2011 |
| JP | 2011148496 A | 8/2011 |
| JP | 2012079043 A | 4/2012 |
| JP | 2013524358 A | 6/2013 |
| JP | 2014503086 A | 2/2014 |
| JP | 2016506580 A | 3/2016 |
| KR | 20080033264 A | 4/2008 |
| KR | 101364356 B1 | 2/2014 |
| WO | 03027882 A1 | 4/2003 |
| WO | 2007011576 A2 | 1/2007 |
| WO | 2007049625 A1 | 5/2007 |
| WO | 2008022328 A2 | 2/2008 |
| WO | 2011148496 A1 | 12/2011 |
| WO | 2012137262 A1 | 10/2012 |
| WO | 2013001332 A1 | 1/2013 |
| WO | 2013121456 A1 | 8/2013 |

(56) References Cited

FOREIGN PATENT DOCUMENTS

| WO | 2014178896 A1 | 11/2014 |
| WO | 2016028346 A1 | 2/2016 |

OTHER PUBLICATIONS

Communication under Rule 71(3) EPC of intention to grant for European Application No. 17182635.7 dated Jan. 12, 2021, 64 pages.
First Examination Report for Australian Application No. 2016381309 dated Apr. 17, 2018, 2 pages.
International Search Report and Written Opinion for PCT Application No. PCT/IB2016/055254 dated Dec. 9, 2016, 12 pages.
Notification of Reason for Refusal for Japanese Application No. 2019-144756 dated Dec. 22, 2020, 11 pages.
Office Action for U.S. Appl. No. 14/856,246 dated Apr. 8, 2016, 5 pages.
Summons to Attend Oral Proceedings Pursuant to Rule 115(1) EPC for European Application No. 14/856,246 dated Jan. 26, 2021, 11 pages.
Third Office Action for Chinese Application No. 201710635647.5 dated Aug. 6, 2018, 20 pages.
Turczyk Lars., et al., "A Method for File Valuation in Information Lifecycle Management", Association for Information Systems AIS Electronic LibraryAISeL) , AMCIS2007 Proceedings Americas Conference on Information Systems (AMCIS) RalfAMCIS 2007 Proceedings, Jan. 1, 2007 (Jan. 1, 2007), XP055765829, Retrieved from the internet:URL:https://core.ac.uk/download/pdf/301340079.pdf, 13 pages.
Turczyk Lars., et al., "[THSt07] File Valuation in Information LifecycleManagement", International Conference, Jan. 1, 2007 (Jan. 1, 2007), XP055765820, Retrieved from the Internet: URL: http://www.kom.tu-darmstadt.de/papers/THSt07_649.pdf [retrieved on Jan. 15, 2021), 7 pages.
Wijnhoven F., et al., "Value-Based File Retention: File Attributes as File Value and Information Waste Indicators", Journal of Data and Information Quality (JDIQ), vol. 4, No. 4, May 1, 2014 (May 1, 2014), XP058048822, ISSN: 1936-1955, DOI: 10.1145/2567656 , pp. 1-17.
Communication Pursuant to Article 94(3) EPC for European Application No. 21185865.9 dated Apr. 7, 2022, 6 pages.
Non-Final Office Action from U.S. Appl. No. 16/035,677, dated Jul. 23, 2020, 14 pages.
Communication Pursuant to Article 94(3) EPC for European Application No. 16766091.9 dated Jan. 13, 2021, 6 pages.
Notice of Allowance from U.S. Appl. No. 15/420,014, dated Jun. 17, 2020, 5 pages.
Communication pursuant to Article 94(3) EPC for European Application No. 19182730.2 dated Feb. 26, 2021, 6 pages.
Result of Consultation for European Application No. 17182636.5 dated May 27, 2021, 9 pages.
Non-Final Office Action from U.S. Appl. No. 16/685,528, dated Oct. 5, 2021, 15 pages.
Extended European Search Report for European Application 21185865.9 dated Oct. 25, 2021, 8 pages.
Decision of Refusal for Japanese Application No. 2019-144756 dated Jun. 21, 2021, 12 pages.
Advisory Action from U.S. Appl. No. 15/396,060, dated Mar. 23, 2020, 3 pages.
Blakowski G., et al., "Tool Support for the Synchronization and Presentation of Distributed Multimedia," Butterworth-Heinemann Ltd., vol. 15, No. 10, Dec. 1992, pp. 611-618.
Communication Pursuant to Article 94(3) for EP Application No. 17182635.7 dated Feb. 17, 2020, 6 pages.
Communication Pursuant to Article 94(3) for EP Application No. 17182636.5 dated Feb. 17, 2020, 6 pages.
Decision of Refusal for Japanese Application No. 2018-516514 dated Aug. 13, 2019, 8 pages.
Examination Report for EP Application No. 15778056.0 dated Jul. 13, 2018, 8 pages.
Extended European Search Report for EP Application No. 19182730.2 dated Nov. 21, 2019, 10 pages.
Extended Search Report for EP Application No. 17182635.7 dated Oct. 27, 2017, 8 pages.
Extended Search Report for EP Application No. 17182636.5 dated Oct. 27, 2017, 7 pages.
Final Office Action from U.S. Appl. No. 15/396,060, dated Jan. 13, 2020, 32 pages.
First Examination Report for Australian Application No. 2017204647 dated Jul. 19, 2017, 3 pages.
First Examination Report for Australian Application No. 2017204654 dated Jul. 19, 2017, 3 pages.
First Office Action for Canada Application No. 2,972,706 dated Jul. 25, 2017, 4 pages.
First Office Action for Chinese Application No. 201580072024.0 dated Mar. 20, 2018, 21 pages.
First Office Action for Chinese Application No. 201710635647.5 dated Feb. 11, 2018, 17 pages.
First Office Action for Chinese Application No. 201710635654.5 dated Mar. 28, 2018, 18 pages.
International Search Report and Written Opinion for PCT Application No. PCT/IB2015/057577 dated Mar. 14, 2016, 21 pages.
Non Final Office Action from U.S. Appl. No. 15/727,567, dated Aug. 15, 2019, 9 pages.
Non-Final Office Action from U.S. Appl. No. 15/396,060, dated Sep. 16, 2019, 29 pages.
Notice of Allowance from U.S. Appl. No. 15/396,060, dated Jun. 25, 2020, 11 pages.
Notice of Allowance from U.S. Appl. No. 15/727,567, dated Dec. 27, 2019, 2 pages.
Notice of Allowance from U.S. Appl. No. 15/727,567, dated Nov. 4, 2019, 2 pages.
Notice of Allowance from U.S. Appl. No. 15/727,567, dated Oct. 10, 2019, 9 pages.
Notification of Reexamination for Chinese Application No. 201710635647.5 dated Aug. 28, 2019, 17 pages.
Notification of Reexamination for Chinese Application No. 201580072024.0 dated Aug. 22, 2019, 18 pages.
Office Action for Korean Patent Application No. 10-2018-7031669 dated Nov. 5, 2019, 4 pages.
Office Action for Canada Application No. 2,977,692 dated Jun. 15, 2018, 3 pages.
Office Action for Japanese Application No. 2017-162580 dated Dec. 19, 2017, 5 pages.
Office Action for Japanese Application No. 2017-162580 dated Mar. 26, 2018, 7 pages.
Office Action for Japanese Application No. 2017-162581 dated Dec. 19, 2017, 5 pages.
Office Action for Japanese Application No. 2017-162581 dated Mar. 26, 2018, 7 pages.
Office Action for Japanese Application No. 2017-534702 dated Dec. 19, 2017, 7 pages.
Office Action for Japanese Application No. 2017-534702 dated Mar. 26, 2018, 5 pages.
Office Action for Japanese patent Application No. 2018-516514, dated Dec. 6, 2019, 5 pages.
Office Action for Korean Application No. 10-2017-7017998 dated Mar. 21, 2018, 5 pages.
Office Action for Korean Application No. 10-2017-7018184 dated Mar. 28, 2018, 9 pages.
Office Action for Korean Application No. 10-2017-7018190 dated Mar. 28, 2018, 9 pages.
Office Action for U.S. Appl. No. 14/611,115 dated Jun. 5, 2015, 27 pages.
Office Action for U.S. Appl. No. 14/611,115 dated Nov. 20, 2015, 21 pages.
Office Action for U.S. Appl. No. 15/133,185 dated May 19, 2017, 17 pages.
Office Action for U.S. Appl. No. 15/209,672 dated Dec. 6, 2017, 19 pages.

(56) References Cited

OTHER PUBLICATIONS

Office Action for U.S. Appl. No. 15/209,672 dated Jun. 1, 2018, 18 pages.
Office Action for U.S. Appl. No. 15/209,672 dated Sep. 20, 2018, 11 pages.
PCT Invitation to Pay Additional Fees for PCT Application No. PCT/IB2015/057577 dated Dec. 9, 2015, 7 pages.
PCT Invitation to Pay Additional Fees for PCT Application No. PCT/IB2015/057577 dated Feb. 10, 2017, 5 pages.
Reexamination Decision for Chinese Application No. 201580072024.0 dated Dec. 25, 2019, 26 pages.
Reexamination Decision for Chinese Application No. 201710635647.5 dated Feb. 27, 2020, 19 pages.
Second Office Action for Chinese Application No. 201710635647.5 dated May 10, 2018, 9 pages.
Written Opinion of the International Preliminary Examining Authority for PCT Application No. PCT/IB2015/057577 dated Mar. 14, 2017, 18 pages.
Notice of Allowance from U.S. Appl. No. 16/685,528, dated Jan. 11, 2022, 10 pages.
Notice of Allowance from U.S. Appl. No. 15/396,060, dated Aug. 28, 2020, 11 pages.
Extended Search Report for EP Application No. 17167845.1 dated Aug. 22, 2017, 8 pages.
Extended Search Report for EP Application No. 17167846.9 dated Aug. 22, 2017, 8 pages.
International Search Report and Written Opinion for PCT Application No. PCT/IB2017/052326 dated Aug. 22, 2017, 15 pages.
Non-Final Office Action from U.S. Appl. No. 15/420,014, dated Dec. 13, 2019, 47 pages.
Notice of Allowance from U.S. Appl. No. 15/420,014, dated Apr. 16, 2020, 9 pages.
Office Action for U.S. Appl. No. 15/420,003 dated Jun. 16, 2017, 6 pages.
Office Action for U.S. Appl. No. 15/420,014 dated Aug. 7, 2019, 50 pages.
Office Action for U.S. Appl. No. 15/420,014 dated Feb. 7, 2019, 40 pages.
Notice of Allowance from U.S. Appl. No. 16/035,677, dated Sep. 25, 2020, 8 pages.
Communication under Rule 71(3) EPC of intention to grant for European Application No. 19182730.2 dated Jun. 14, 2021, 65 pages.
Decision to refuse for European Application No. 17182636.5 dated Jul. 22, 2021, 23 pages.
Communication under Rule 71 (3) EPC for European Application No. 21185865.9 dated Jul. 28, 2022, 65 pages.

* cited by examiner

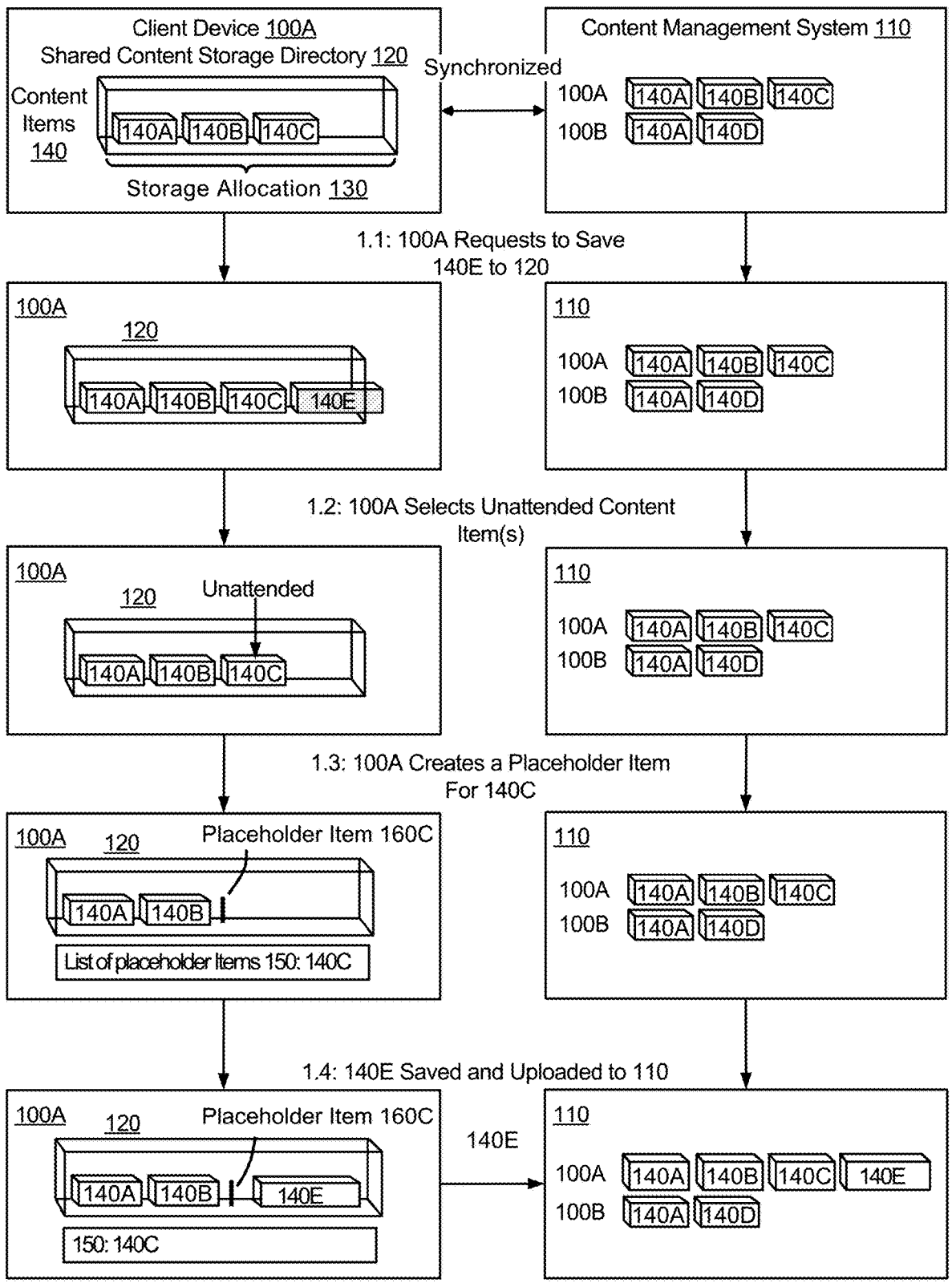

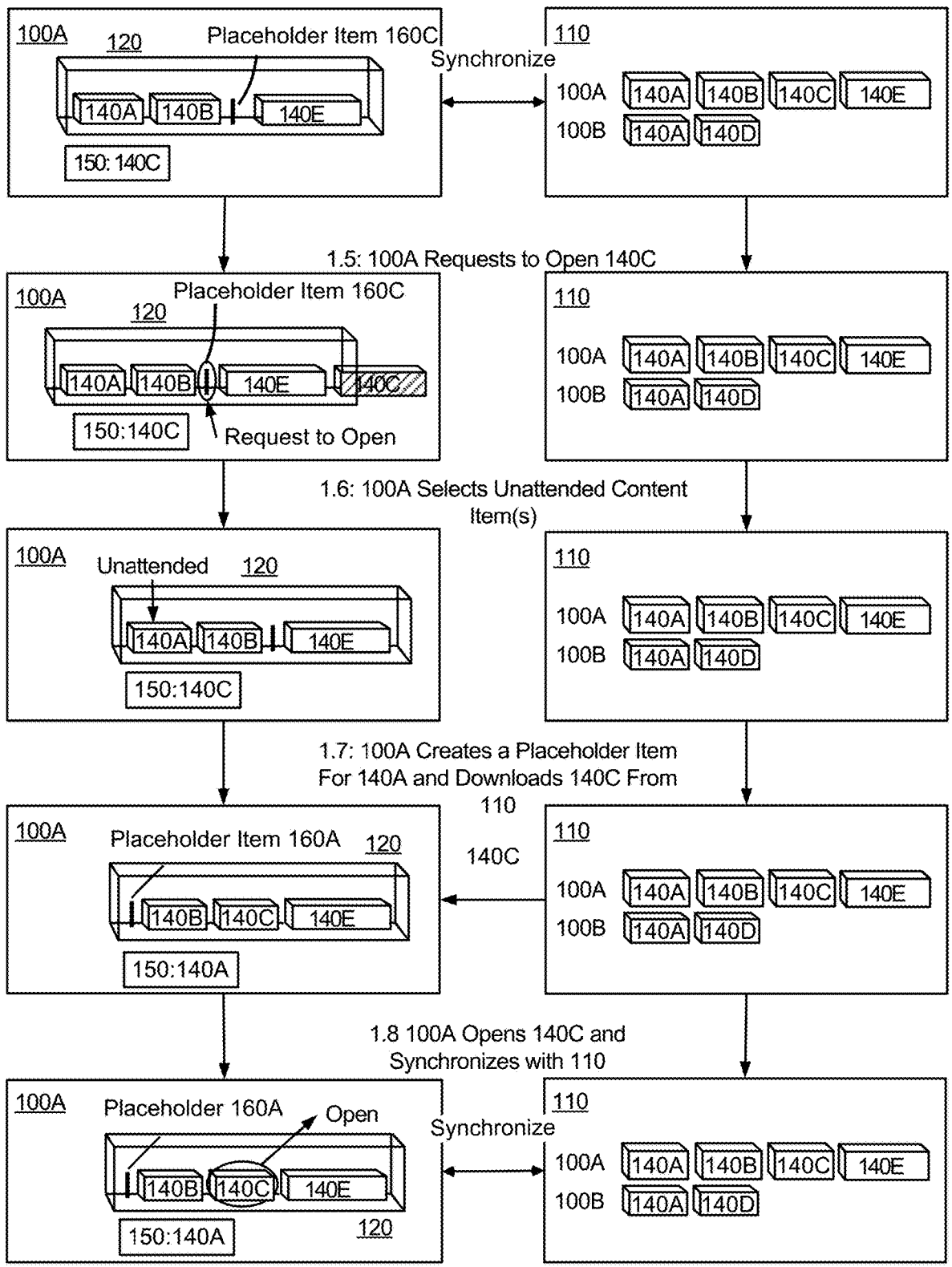

STORAGE CONSTRAINED SYNCHRONIZATION ENGINE

CROSS REFERENCE TO RELATED APPLICATIONS

This application is a continuation of U.S. application Ser. No. 15/420,014, filed Jan. 30, 2017, now U.S. Pat. No. 10,719,532, which application claims the benefit of U.S. Provisional Application No. 62/327,379, filed Apr. 25, 2016, all of which are hereby incorporated in their entirety by reference.

BACKGROUND

The described embodiments relate generally to improving the performance of computer systems providing content item synchronization, and particularly to improving the synchronization of content items between a client device and a content management system where storage allocation for synchronized content items is constrained.

Content management systems enable users to share content items from one client to another client. The clients are computing devices that provide content items to a content management system for storage and synchronization with other clients. The other clients may be operated by another user or may be devices registered or managed by the same user. A user designates which content items or directories containing content items are available to be shared with other users, and thus synchronized to the client devices of such users. Generally, a content management system synchronizes a given content item with all of the client devices that have been designated to share the content item. As a result, each of these client devices may store a very large amount of shared content items. In some cases, the amount of storage taken up on a client device by the shared content items substantially reduces the amount of storage available on the client device for other items, such as unsynchronized content items and applications.

BRIEF DESCRIPTION OF THE DRAWINGS

FIGS. 1A and 1B are concept diagrams that illustrate one embodiment of constrained synchronization.

Figure 2:
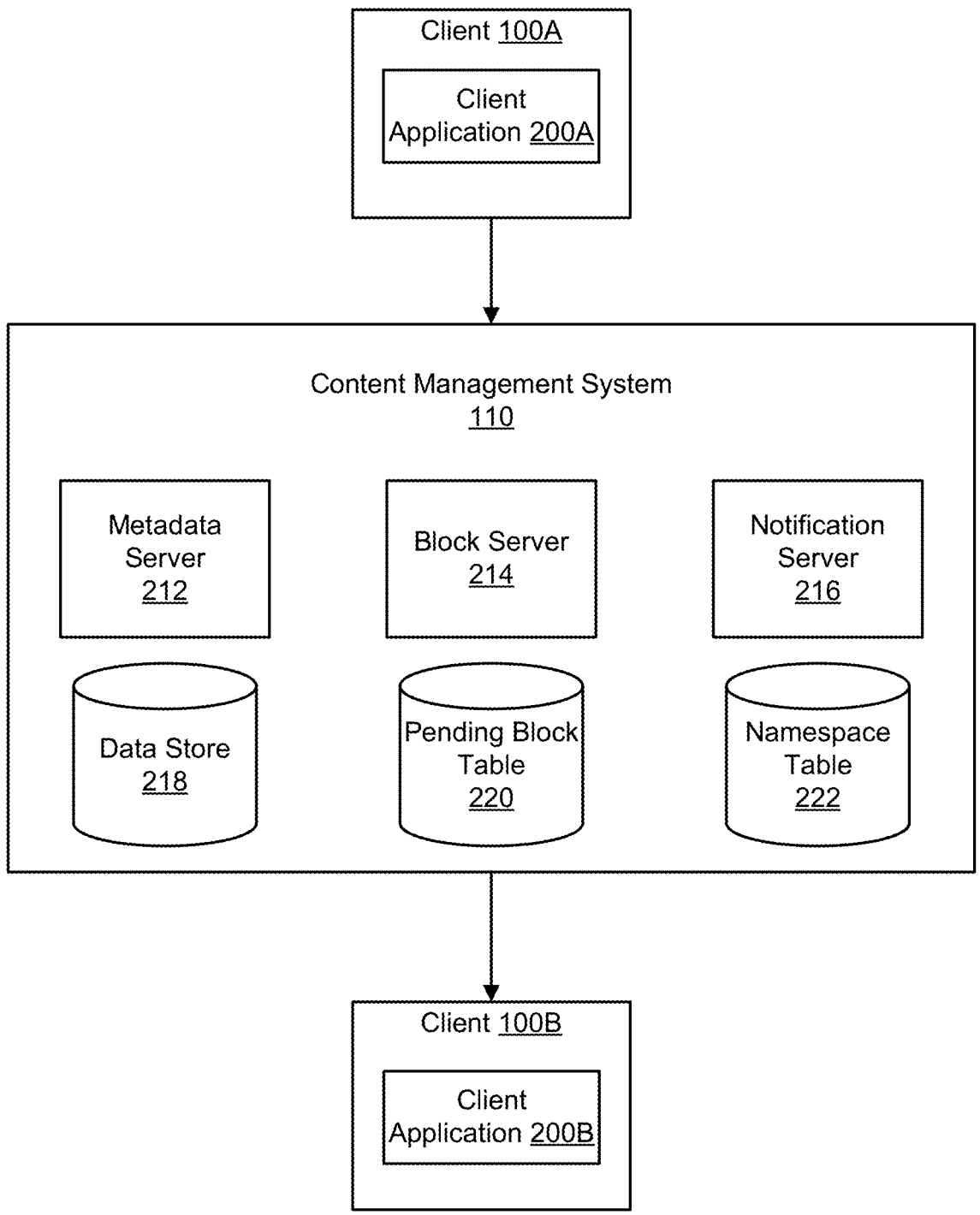
FIG. 2 illustrates a system environment for a content management system that synchronizes content items between client devices.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Functional Overview of Constrained Synchronization

A general functional overview of a constrained synchronization system and process is now described. As a preliminary condition, users store content items on client devices, and the content items are synchronized with instances of the content items on other clients and with a host system, typically a content management system. A client device stores the content items in a local content directory. Content items stored in the local content directory are synchronized with a content management system, which maintains copies of the content items and synchronizes the content items with other client devices. Each client device executes a client application, which enables the user to access the content management system. The client application further enables the user to configure a maximum storage allocation or size for the local content directory.

In one aspect, the client device is configured to selectively determine which synchronized content items remain locally available on the client device, and which are stored in their entirety only on the content management system. In one embodiment, the client device receives a request to access a content item, for example from an application needing access to the content item. The client device determines whether the requested content item is a placeholder item or a content item stored locally on the client device. A placeholder item is an item that represents or emulates the content item, but does not contain the application data of the content item. Generally, the placeholder item replicates the metadata attributes of the content item, such as the name of the content item, as well as various attributes, such as type, path information, access privileges, modification information, and size of the content item, without storing the actual application content, such as text, image data, video data, audio data, database tables, spreadsheet data, graphic data, source or object code, or other types of content data. Because the placeholder items only store metadata for the content item, they require only a small amount of storage, e.g., typically about four kilobytes, as compared to a content item that can be hundreds of megabytes or even several gigabytes in size. Thus, using placeholder items to represent content items operates to save considerable storage space, thereby improving the functioning of the client device.

Where the client device determines that the requested content item is a placeholder item, this indicates that the requested content item content is not at present stored on the client device, but is stored on the content management system. Accordingly, the client device downloads from the content management system the content item that corresponds to the requested placeholder item. The client device further determines whether storing the content item in the local content directory would exceed the maximum storage size established for that directory. In that case, the client device determines which content item or items in the local content directory can be removed from the local content directory, and replaced with placeholder items that represent the content items. Generally, the client device uses one or more attributes of a shared content item to select content items from the local content directory that have been determined as being unattended by the user of the client device or users with access to the content item via the content management system, including latest access time on the client device (e.g., actions of the user of the client device or applications executing thereon), latest access time on the other client devices with which the content items are shared (e.g., actions of the users of those client devices), content item size, and access frequency. Combinations of these factors may also be used to determine unattended content items. The client device selects a number of content items from the local content directory such that deleting these content items creates a sufficient amount of storage space in the local content directory to allow the downloaded content item to be stored therein without exceeding the maximum storage size. In one embodiment, the client device selects a number of content items so that the total amount of storage used by these content items in the shared content directory at least equals or exceeds the amount of storage required to store the downloaded content item.

The client device deletes the selected content items, and for each deleted content item creates a corresponding placeholder item. The client device stores the placeholder items in the directory locations corresponding to the deleted content items. Storage of the placeholder items in the corresponding locations enables subsequent retrieval of the deleted content items in a manner that is transparent to the requesting applications.

This embodiment provides a constrained shared storage system wherein each client device can maintain access to all content items shared with a content management system while having more space for other content items and applications, and improves the storage efficiency of each client device as well as content management system as a whole. More particularly, the embodiment enables a client device to effectively operate as if it has a significantly larger storage capacity than it does in fact. For example, a client device with only a 10 GB storage allocation for the local content directory can operate as if it had over 4,000 GB (4 TB) of storage allocation for that directory, representing a 400-fold increase in effective storage. In the past, such a solution to limited local storage capacity was made impossible by network connectivity and bandwidth limitations, thus the problem being solved for arises as a result of the recent developments in Internet infrastructure that allows for pervasive connectivity and fast upload and download speeds.

Despite the recent developments in Internet infrastructure, the computational, uploading, and downloading times required for the removal of content items, their replacement with placeholder items, and their restoration following a user request may still impact device performance. Therefore, alternative embodiments are also described that reduce impact on device performance as visible to the user while still reducing the storage burden on a client device over traditional shared content synchronization methods. In one embodiment, the computation, uploading, and downloading are completed based upon a predicted a user access to a shared content item represented as a placeholder item. To predict a user access to a content item, the client application or the content management system maintains a retention score for each content item; the retention score is a measure of the predicted importance to the user of each content item. Each client device is configured with a retention score threshold such that any content item with a sufficiently high predicted importance (represented by a retention score that exceeds a retention score threshold) is downloaded to the corresponding client device. The retention score may be calculated based on a variety of attributes including latest access time, location, type, size, access frequency, shared status, number of accounts with access, number of devices with access, or number of devices storing the content item.

Alternatively, another embodiment allows the storage space occupied by shared content items on a client device to exceed the storage allocation while the activity of the client device is monitored (either by the content management system or by the client application). When a client device is determined as being idle, the client application removes the content items and replaces them with placeholder items, as previously discussed, in order to reduce the effective storage space occupied by the content items stored on the client device. In these embodiments, the storage allocation is not maintained at all times and so occupied storage can be reduced according to other content item attributes. Instead of maintaining a storage allocation, for example, all content items with a latest access date older than a specified amount of time (e.g., two weeks) could be removed and replaced with placeholder items whenever the client device is idle. This process does not keep the occupied storage space below a storage allocation but would reduce it in a way that might be preferable to the user since the operations are done while the client device is idle and thus not being actively used by the user, thereby improving a client device configured to use a constrained synchronization system by offering a user experience improvement over the previously described embodiments while providing a similar increase in effective storage capacity.

FIGS. 1A and 1B are concept diagrams that further illustrate embodiments of constrained synchronization. FIG.

1A illustrates a process of saving a content item in a storage constrained synchronized folder. FIG. 1B illustrates a process of opening a placeholder item on a storage constrained client device.

In FIGS. 1A and 1B, client device 100A is one of a plurality of user controlled devices that can be connected and synchronized with content management system 110. Content management system 110 is a server instantiated to synchronize content from a plurality of client devices using a network. A shared content storage directory 120 is a directory located on the client device 100 that contains content synchronized with content management system 110. A storage allocation 130 is a parameter value that specifies an amount of storage space allowed for all content items in the shared content storage directory 120. The storage allocation 130 can be set by the user of the client device 100A, the operating system of the client device 100, a client application of content management system 110, by a system administrator, or by policies established at content management system 110. An example value for the storage allocation 130 is 10 GB; this means that the user can store up to 10 GB of content items in their entirety (all content item attributes and data) in the shared content storage directory 120. Content items 140 are saved within the shared content storage directory 120; after synchronization between a client device 100 and content management system 110 a version of each content item 140 in the shared content storage directory 120 is also maintained by content management system 110.

The term "content item", as used herein indicates any file, group of files, or collection of files. Any content item that consists of only a single file may alternatively be referred to as a file. Additionally, terms such as "file table" may be used to refer to both individual files or content items.

In FIG. 1 the shared content storage directory 120 is graphically depicted as a box that contains the content items 140. The storage allocation 130 is represented by the particular length of the box representing the content storage directory 120.

The first illustration of the client device 100A and content management system 110 represents a typical state of the two entities. The client device has content items 140A, 140B, and 140C stored within its shared content storage directory 120 (only a small number of content items 140 are shown for the purpose of explanation, as in practice the number of content items 140 can be in the thousands, tens of thousands, or more). Content management system 110 is represented as being synchronized with client device 100A and so it maintains an identical version of each of the content items stored on the client device 100A though it does not have a storage allocation 130. Additionally, content management system 110 supports another client device 100B, with which the content item 140A is shared. The presence of content item 140D in association with the identification of client device 100B indicates that client device 100B is also synchronizing this content item 140D with content management system 110. Thus, each client device 100 can synchronize content items 140 with only content management system 110 or with content management system 110 and other client devices 100.

Stage 1.1 illustrates the operation of a request from client device 100A to save content item 140E to the shared content storage directory 120. However, as illustrated, the addition of content item 140E to the shared content storage directory 120 would cause the total storage space occupied by the content items 140 to exceed the storage allocation 130, since the size of content item 140E exceeds the remaining available space in the shared content directory 120 as limited by the storage allocation 130.

Stage 1.2 illustrates the operation of the selection of an unattended content item 140C to be removed from the client device 100, so as to make available sufficient storage in which content item 140E can be stored. Depending on the embodiment, either the client device 100 or content management system 110 determines which content items 140 to select as being unattended. A variety of methods, discussed below can be used to determine which content items are selected as unattended. While only a single content item 140C is selected in this example, in practice any number of content items 140 may be selected, depending on the amount of storage capacity that needs to be made available.

Stage 1.3 illustrates the operation of removing the selected content item 140C from the client device 100A. In place of each removed content item, the client device 100A creates a placeholder item 160C that represents the removed content item 140C, and stores the placeholder item in the same location in the shared content storage directory 120 as the removed content item 140C. Alternatively, the content management system 110 may create the placeholder item 160C and then download the placeholder item 160C to the content storage directory 120. The placeholder item includes attributes that represent the removed content item 140C, such as the content name, path information, content attributes, and content size, but without containing the actual data of the content item 140C. By not including the actual data of their corresponding content items, placeholder items require considerably less storage. For example, a placeholder item typically requires no more than the smallest file size allocation provided by the operating system, such as 4 KB. This small size is illustrated visually in FIG. 1 using a vertical line, showing that the size of the placeholder item is negligible when compared to the content item 140C itself. For example, while the removed content item 140C may be many megabytes or even gigabytes in size (very common for audio or video files), the storage required for a placeholder item representing such a content item would still be only 4 KB or so. As a result, the client device 100 is able to reduce the amount of local storage used for shared content items to an amount below the storage allocation 130, and thereby make available sufficient space to store the newly created (or updated such that the new version of the content item is larger) content item 140E. Information identifying the selected (and removed) content items is maintained on the client device 100A, to allow these items to be selectively retrieved at a later time. This information is stored locally in client device 100 in a list 150 of stored content items that are remotely stored in remote content item table 366 (as further described below, not illustrated in FIG. 1A) in content management system 110.

Stage 1.4 illustrates the operation of saving content item 140E to the client device 100A once sufficient space has been made available in the shared content storage directory 120. Once the client device 100A successfully saves the content item 140E to the shared storage directory 120, synchronization with content management system 110 is initiated and content item 140E is uploaded to content management system 110. Content management system 110 still maintains full copies of all content items (including placeholder items) on client device 100A.

Referring now to FIG. 1B, client device 100A and content management system 110 are shown after content item 140E has been synchronized between the client device 100A to the client management system 110.

Stage 1.5 illustrates the operation of client device 100A requesting access to content item 140C (e.g., open content item 140C using a word processor, or show the content item in a file browser), wherein client device 100 determines that the requested content item is represented by a placeholder item. If the content item is stored locally, it is provided to the requesting application on the client device 100A. In this case the requested content item has been removed from the client device 100A and is only stored remotely on content management system 110, so the client device 100 requests content management system 110 to download the requested content item. If there is sufficient space on the shared content storage directory 120, content management system 110 downloads the requested content item to the client device 100A; the client then replaces the placeholder item 160C that represented content item 140C with content item 140C itself, which allows any requesting application to access the content item transparently. However, in this case, the addition of content item 140C to the shared content storage directory 120 would exceed the storage allocation 130, as depicted by content item 140C extending outside the boundaries of the shared content storage directory 120.

Stage 1.6 illustrates the operation of selecting unattended content item(s) for removal from the client device 100A. In this case, the unattended content item selected is content item 140A.

Stage 1.7 illustrates the operation of removing content item 140A and replacing it with its placeholder item 160A. This removal creates enough space in shared content storage directory 120 for content item 140C to be downloaded from content management system 110 and appended to its placeholder item representation without exceeding the storage allocation 130. The removed content item 140A is included in the list 150 of remotely stored content items, and content item 140C is removed from this list 150, since it has been restored to the shared content directory 120.

Stage 1.8 illustrates that once content item 140C is resident on client device 100A it can be opened by the requesting application. Once the processes illustrated by FIGS. 1A and 1B on client device 100A have been completed, normal synchronization can occur between client device 100A and content management system 110 such that all changes to content items 140 on client device 100A are mirrored on content management system 110. All content items 140 (even if represented by placeholder items) are maintained on content management system 110 until they are deleted from the shared content storage directory 120.

Overview of System Architecture

FIG. 2 illustrates the system architecture of a constrained synchronization system. Details about each component will be further described in a later section, however some elements are introduced here to provide context for the explanation of constrained synchronization. Further, as is apparent to those of skill in the art, the operations and methods used in constrained synchronization necessarily require a computer, and are not performed in any embodiment by mental steps by a human operator. Further, while the operations may make use of the facilitates of a computer to store and retrieve information, transmit and send information, or process information, those of skill in the art appreciate that such operations are not simply generic computer operations since they are herein performed in specific manners on specifically defined data using the algorithms described herein, and thus require configuration of a computer in a manner different from how such computers are provisioned natively by their operating system and standard applications alone. Additionally, the required configuration enhances the storage capacity of the computer, through the steps detailed below, over generic, general purposes computers configured with conventional operating systems and file management systems.

Client devices 100 communicate with content management system 110 through a network, not shown, which can be any suitable communication means providing internetworking between client devices 100 located remotely from content management system 110; e.g., a LAN, WAN, or WAN. In general, client device 100A with a client application 200A installed provides content items to content management system 110. The client application 200A contains the programs and protocols necessary for client device 100A to perform the functions associated with storage constrained synchronization. Therefore, client device 100A often performs actions requested by the client application 200A. However because client device 100A and client application 200A act together, for ease of description some of these actions are referred to using "client device 100A" as the operative element. The user of client device 100A has designated certain of the content items to be shared with client device 100B, which for example, can be another computer managed by the same user, or a computer operated by a different user. Content management system 110 notifies client device 100B and synchronizes the designated content items received from client device 100A with local content stored at client device 100B.

Content management system 110 associates each content item with a namespace corresponding to a set of content items. A namespace designates a directory (or "folder") in a directory structure into which the given content items are stored. The association of content items with particular namespaces is stored in a namespace table 222. Content management system 110 associates each client with the namespaces (and content items therein) to which it has access, along with an identification of the specific rights to access, modify, and delete the content items in each namespace. When clients 100 are synchronized to a namespace, the clients store a local copy of content items associated with the namespace and organize the content items according to content location, if available. A user may be associated with an individual client device 100 or with multiple clients 100; for example, a user may have a home computer, a work computer, a portable computer, a smartphone, and tablet computer all synchronized together. To share content items, a user designates a namespace to be shared with other users and/or clients. Content management system 110 then synchronizes the content items in the shared namespace(s) across the clients 100 associated with the shared namespace. The content items stored at content management system 110 can include any type of content item, including documents, data, movies, applications, code, images, music, and so forth. The content item may also be a folder or other mechanism of grouping content items together, such as a collection, playlist, album, file archive, and so forth.

Each user is associated with an account on content management system 110 that includes information specifying an amount of storage to be used for storing content items on content management system 110. A client device also has a designated amount of local storage for storing the synchronized content items, which is the size of the shared content storage directory 120; this designated amount is the storage allocation parameter 130 described above. For example a user's account may specify that the user has 50 GB of storage available on content management system 110, but has a storage allocation on the client device 100 of only 10 GB. In circumstances such as this, when the user modifies a shared content item that is stored locally, the content item may increase in size, and thereby exceed the storage allocation on the client device 100. Similarly, the user may exceed the storage allocation on the client device 100 by creating and storing in the shared content directory 120 a new content item to be shared and synchronized with content management system 110. In these cases, the amount of shared content items exceeds the storage allocation for the client device 100, in which event the client device 100 is storage constrained and can no longer maintain a local copy of all content items synchronized by content management system 110.

Either the client device 100 or content management system 110 is configured to select one or more content items to remove from the local storage while still maintaining them remotely on content management system 110, so that they can be subsequently retrieved and restored to the client device 100. Generally, the content items that are selected are those that are least recently accessed, either on the particular client device 100 on which the request to access the content item is made, or across all client devices 100 on which the content items are shared; other methods of selections are discussed further in a following section. In a client-based embodiment, the client application 200 maintains information identifying the latest access for each shared content item stored on the client device 100. When storage is constrained, the client application 200 selects one or more of the content items that have been least recently accessed (herein, "LRA"). In a host-based embodiment, content management system 110 maintains the access data for every content item; the system 110 updates this information anytime a content item is accessed on any client device 100 with which the content item is shared. LRA selection is only one of a number of possible unattended content item selection methods (herein "UCSM") each of which can be implemented as either a host-based or client-based system. Any UCSM may consult the vnode reference for the each content item to determine whether it is eligible for removal. The vnode for each content item contains information regarding a number of accesses to the content item as well as other content item status indicators including whether or not the content item is currently in use or open.

For succinctness, whenever content items are selected for removal from residency on a client device 100 in response to a storage constraint, the operation is referred to herein as "selecting the unattended content items," since most of the UCSM operate to identify those content items that are least likely to be accessed by the user. Unattended content item refers to content items selected by any UCSM outlined in the following discussion.

Basic LRA Selection: To perform basic LRA selection, the client application 200 maintains a queue of content items ordered by latest local access date with the least recently accessed content item at the top of the queue. The latest access date and time for each content item is maintained in a content access history table. An access to a content item includes the actions of creating, opening, previewing, or modifying a content item. Any number of these actions can be deemed an access, for example, an embodiment might deem an access to be either opening, modifying, or saving a content item but previewing a content item may not be deemed an access. A cumulative sum (e.g., running total) of the storage size is calculated for each content item listed in the queue starting with the least recently accessed content item identified in the queue (i.e., the content item at the top of the queue), and ending with the content item at the end of queue. When storage is constrained, the client application 200 determines an amount of storage space required to store a content item, and so progresses through the queue to identify the index of the content item for which the cumulative storage size exceeds the storage space requirement. The identified index is used to select all content items above and including that index in the queue for removal from the shared content storage directory 120 on the client device 100.

These processes are further explained in Table 1. In this example, 75 MB of storage are required to store a content item. Because content items A and B only total 70 MB, removal of these two content items does not provide a sufficient amount of storage for the item. Accordingly, content items A, B, and C, which have a total cumulative side of 150 MB are selected (as indicated by the designation in the rightmost column), at corresponding indices 00, 01, and 02.

TABLE 1

| Item Index | Item Name | Local Access Time | Item Size | Cumulative size | Selected? |
|---|---|---|---|---|---|
| 00 | Item A | Dec. 3, 2014 4:33 PM | 10 MB | 10 MB | Yes |
| 01 | Item B | Mar. 24, 2014 5:12 PM | 50 MB | 60 MB | Yes |
| 02 | Item C | Mar. 24, 2014 6:18 PM | 20 MB | 80 MB | Yes |
| 03 | Item D | Mar. 30, 2014 6:22 PM | 80 MB | 160 MB | No |
| 04 | Item E | May 18, 2014 7:53 AM | 20 MB | 180 MB | No |

Remote LRA Selection: LRA selection can also be based on remote accesses by other users that have access to the content items through content management system 110, either directly thereon, or on client devices 100 which have shared versions of the content items. To accomplish this, in one embodiment, each client device 100 synchronizes its own content access history table with content management system 110, for example, during normal content item synchronization operations, or at other times. This embodiment enables each client device 100 to maintain current access information for every content item that it shares with any other client device. Alternatively, for a host based embodiment, content management system 110 may maintain a content access history table that contains the access history for each content item across all client devices that are designated for synchronization and sharing, so that it has a currently updated list to use for LRA selection. Remote LRA selection then includes the content management system 110 selecting the least recently accessed content items whose cumulative storage size exceeds the required storage space. In this embodiment, this queue is ordered by latest access times from all client devices that are synchronized with respect to the content item.

Table 2 is an example of how remote LRA may be implemented. In this example, Content items B and C were last accessed remotely on a different client device on May 24, 2014 and Apr. 5, 2014 respectively but were both last accessed locally on Mar. 24, 2014 (as listed in Table 1). This change in latest access date for Items B and C, due to their remote accesses, moves them farther down in the queue compared to when basic LRA selection is used. As a result, in this example, Items A and D are selected instead of A, B and C.

TABLE 2

| Index | Item Name | Last Access Time Across all Sharing Clients | Item Size | Cumulative Sum | Selected? |
|---|---|---|---|---|---|
| 00 | Item A | Dec. 3, 2014 4:33 PM | 10 MB | 10 MB | Yes |
| 01 | Item D | Mar. 30, 2014 6:22 PM | 80 MB | 90 MB | Yes |
| 02 | Item C | Apr. 5, 2014 5:57 PM | 20 MB | 110 MB | No |
| 03 | Item E | May 18, 2014 7:53 AM | 20 MB | 130 MB | No |
| 04 | Item B | May 24, 2014 5:12 PM | 50 MB | 180 MB | No |

Content item Size Selection: Another factor that may be used to select content items for removal is their size. In one embodiment, size is used to minimize the number of content items that are removed and stored remotely from the client device 100. This can be accomplished by ordering the queue by size (smallest to largest) instead of by access date. Then the required storage space value could be compared to the individual sizes until a content item having a size that exceeds the required storage space is identified. The client application 200 would then select this content item for removal. If no single content item is larger than the required storage space then the largest content item would be selected and its size subtracted from the required storage space value and the process would be repeated from the beginning of the queue.

Table 3 is an example of this selection method. For this example, 40 MB of storage are required to store a content item. Item B is the first content item by queue index that exceeds the required storage value of 40 MB and so it is selected for removal from client 100.

TABLE 3

| Index | Item Name | Access Time | Item Size | Selected? |
|---|---|---|---|---|
| 00 | Item A | Dec. 3, 2014 4:33 PM | 10 MB | No |
| 01 | Item C | Mar. 24, 2014 6:18 PM | 20 MB | No |
| 02 | Item E | May 18, 2014 7:53 AM | 20 MB | No |
| 03 | Item B | Mar. 24, 2014 5:12 PM | 50 MB | Yes |
| 04 | Item D | Mar. 30, 2014 6:22 PM | 80 MB | No |

Content item Size and Access Time Based Selection: The size selection method just described may sometimes select frequently accessed content items for removal. By taking both size and access time into account the content management system can avoid removing content items from a client device 100 that may be requested by the user in the near future. In one embodiment, this dual-variable selection method is accomplished by calculating a weighted score for each content item, based on the amount of storage each content item contributes to reaching the required storage allocation and its last access date. For example $$Score = w_1 S + w_2 A$$

where S is a metric representing the content item size, A is a metric representing the time since the last access to the content item, and $w_1$ and $w_2$ are the weights. The weights for A and S can based on their relative importance, as determined by the user, by a system administrator, or the based on historical content item access patterns for content items on the particular client device 100. The queue is then be ordered by Score and the first content item in the queue is selected for removal.

An example implementation of this selection method is illustrated in Table 4 below. For the purposes of this simple example, the access time metric A is the ratio of the difference between the current time and the latest access for the particular content item and the difference between the present time and least recently accessed item access (in this case the date used was Sep. 3, 2014). In this example, size metric is the relationship:

For $s \geq r$: $S = r/s$

For $s < r$: $S = s^2/r^2$ where s is the content item size, r is the required storage space, and S is the size metric. This piecewise function has a maximum of 1 when s=r.

In the example displayed in Table 4, the required storage space is 40 MB and the weights $w_1$ and $w_2$ are both 1. The size metric and the access time metric are calculated and then used to calculate the total Score, for each content item. In this example, Item B has the highest score and so is selected for removal from the client device 100. If the content item selected has a size smaller than the required storage space, a new required storage space is calculated as the difference between the old required storage space and the size of the first selected content item, the score is recalculated and a new queue is generated for all content items using the newly calculated required storage space, and the selection process is repeated.

TABLE 4

| Index | Item Name | Access Time | Access Time Score | Item Size | Item Size Score | Total Score | Selected? |
|---|---|---|---|---|---|---|---|
| 00 | Item B | Mar. 24, 2014 5:12 PM | 0.67 | 50 MB | 0.8 | 1.47 | Yes |
| 01 | Item D | Mar. 30, 2014 6:22 PM | 0.65 | 80 MB | 0.5 | 1.15 | No |
| 02 | Item A | Jan. 3, 2014 4:33 PM | 1 | 10 MB | 0.06 | 1.06 | No |
| 03 | Item C | Mar. 24, 2014 6:18 PM | 0.67 | 20 MB | 0.25 | 0.92 | No |
| 04 | Item E | May 18, 2014 7:53 AM | 0.44 | 20 MB | 0.25 | 0.69 | No |

Access Frequency and Recency Selection: In order to better select unattended content items, other factors such as frequency can be considered in addition to access time. High frequency-low recency content items are content items that have been frequently selected sometime in the past (e.g., more than 6 months ago) but not recently; low frequency-low recency content items are content items that have never been frequently accessed. Frequency of access can be measured relative to an average frequency on a particular client device, or across any population of client devices, or by type, name space, source domain, or other content item attributes. For example, if a content item has not been accessed on a client device in the last four months but had been accessed 25 times before that time it is likely to be more relevant to the user than a content item of similar recency that was accessed only once in the past.

In one embodiment, the number of accesses for each content item is maintained (at either client device 100 or content management system 110) in addition to the latest access to each content item. A score is determined for each content item as a weighted combination of metrics representing each variable. For example, a weighted score for each content item, based on a metric for access frequency of a content item and its last access date. For example $$Score = w_1 F + w_2 A$$

where F is a metric representing the access frequency, A is a metric representing the time since the last access to the content item, and $w_1$ and $w_2$ are the weights. The weights for A and F can based on their relative importance, as determined by the user, by a system administrator, or the based on historical content item access patterns for content items on the particular client device 100. The queue is then be ordered by score. A cumulative sum is calculated at each index and is compared to the required storage space. When the required storage space is exceeded by the cumulative sum the index and all content items above that index in the queue are selected for removal from the client device 100.

Table 5 illustrates one example of this selection method. In this example, the required storage space is 40 MB and the weights $w_1$ and $w_2$ are both 1. The queue is ordered by the total score and the cumulative sum is compared to the required storage space. This results in the Item C and E being selected for removal from client device 100.

TABLE 5

| Idx | Item Name | Access Time | Access Time Score | Access Count | Access Number Score | Total Score | Item Size | Cum. Sum | Selected? |
|---|---|---|---|---|---|---|---|---|---|
| 00 | Item C | Mar. 24, 2014 6:18 PM | 0.67 | 50 | 0.83 | 1.50 | 20 MB | 20 MB | Yes |
| 01 | Item E | May 18, 2014 7:53 AM | 0.44 | 60 | 1 | 1.44 | 80 MB | 100 MB | Yes |
| 02 | Item A | Jan. 3, 2014 4:33 PM | 1 | 14 | 0.23 | 1.23 | 10 MB | 110 MB | No |
| 03 | Item D | Mar. 30, 2014 6:22 PM | 0.65 | 32 | 0.53 | 1.18 | 20 MB | 130 MB | No |
| 04 | Item B | Mar. 24, 2014 5:12 PM | 0.67 | 26 | 0.43 | 1.10 | 50 MB | 180 MB | No |

Any of the above UCSM may consider entire folders within a single queue index instead of only individual files. For example, if the LRA UCSM is being used and a folder contains a plurality of files, where the most recently accessed file within the folder has an earlier access date than all other content items in the shared content directory it may be more efficient to select the entire folder as unattended (especially if significant storage space is required). Alternatively, the combined metric for the folder, could be an average, median, or other statistic that generalizes the content items within the folder allowing it to be placed into the queue.

In the following description, any of the foregoing methods may be used to select unattended content items for removal from a client device 100. This process of selecting unattended content items enables the enhanced storage capabilities on the client device, as provided by the constrained content management system 100.

Overview of Content Management System

The method of synchronization using content management system 110 between client devices 100A and 100B can be explained with reference to the architecture illustrated by FIG. 2. The following describes one of a number of possible methods of synchronization that may be used with storage constrained synchronization.

Content management system 110 stores content items in data store 218. Content items are stored in fixed size portions termed a block. The size of a block varies according to the implementation, and in one embodiment, the blocks are 4 megabytes in size. Thus, a small content item is stored as a single block, while a large content item may be split up into dozens, hundreds, or more blocks for storage at content management system 110. The metadata includes a blocklist that defines the blocks in the content item and an ordering of the blocks in the content item.

Pending block table 220 maintains a list of pending blocks expected to be received at content management system. Pending block table 220 stores an association between blocks (identified by block identifiers) and the namespaces to which the blocks belong that clients 100 indicate will be transmitted.

Namespace table 222 stores data associating individual content items with namespaces and maintains data associating each namespace with clients.

Metadata server 212 is responsible for managing a request from the client to add ("commit") a new content item to content management system 110. Metadata server 212 also receives requests to synchronize content items from client device 100. Metadata server 212 maintains a record of the last time that client device 100 synchronized with content management system 110. When a request is received from client device 100 to synchronize, metadata server 212 determines any content items that have been committed to namespaces synchronized to that client device 100 since the last synchronization time stamp. In addition, metadata server 212 determines any pending blocks that have been received since the last synchronization time stamp.

Notification server 216 is responsible for communicating with clients 100, and particularly with notifying clients that new data is available. The notification server 216 maintains a list of clients 110 associated with each namespace at namespace table 222. When the notification server 216 receives an alert from block server 214 or metadata server 212 that a new block is available for a given namespace, notification server 216 identifies clients associated with the namespace from namespace table 212. Notification server 216 notifies client(s) 100 associated with the namespace to wake client(s) 100 and indicates that new blocks are available for the identified namespace.

A typical synchronization between two clients 100, client device 100A and client device 100B occurs as follows. First, client device 100A adds an additional content item to the shared data. The additional content item is then transmitted to content management system 110. Content management system 110 notifies client device 100B that the additional content item is in the shared data, and client device 100B retrieves the additional content item from content management system 110 as client device 100B. Content management system 110 maintains a list of content items and pending blocks that are expected to be received at content management system 110 using a pending block table 220, and notifies client device 100B to download blocks corresponding to a content item as blocks are received by content management system 110. Pending blocks are those blocks that correspond to a content item that content management system 110 expects to receive and are used to identify blocks that may be provided to receiving client device 100B prior to a content item being committed to content management system 110.

To manage in-transit content items, content management system 110 retains a list of pending blocks along with the namespace associated with the pending blocks. When a pending block is received, clients associated with the namespace are notified and can initiate a transfer for the received block. Thus, uploading clients (providing a new content item) and downloading clients (receiving the new content item) may asynchronously transfer blocks to content management system 110.

Overview of Client Device

Each client device 100 is a computing device, such as a desktop, laptop, tablet, mobile device, or other system that maintains a local copy of shared data synchronized with content management system 110 and with other clients using the installed client application 200. The shared data may be synchronized only with clients associated with a single user, or may be synchronized to clients associated with multiple users. Client device 100 includes modules and applications for manipulating and adding data to the shared data, as further described with respect to FIG. 3.

Figure 3:
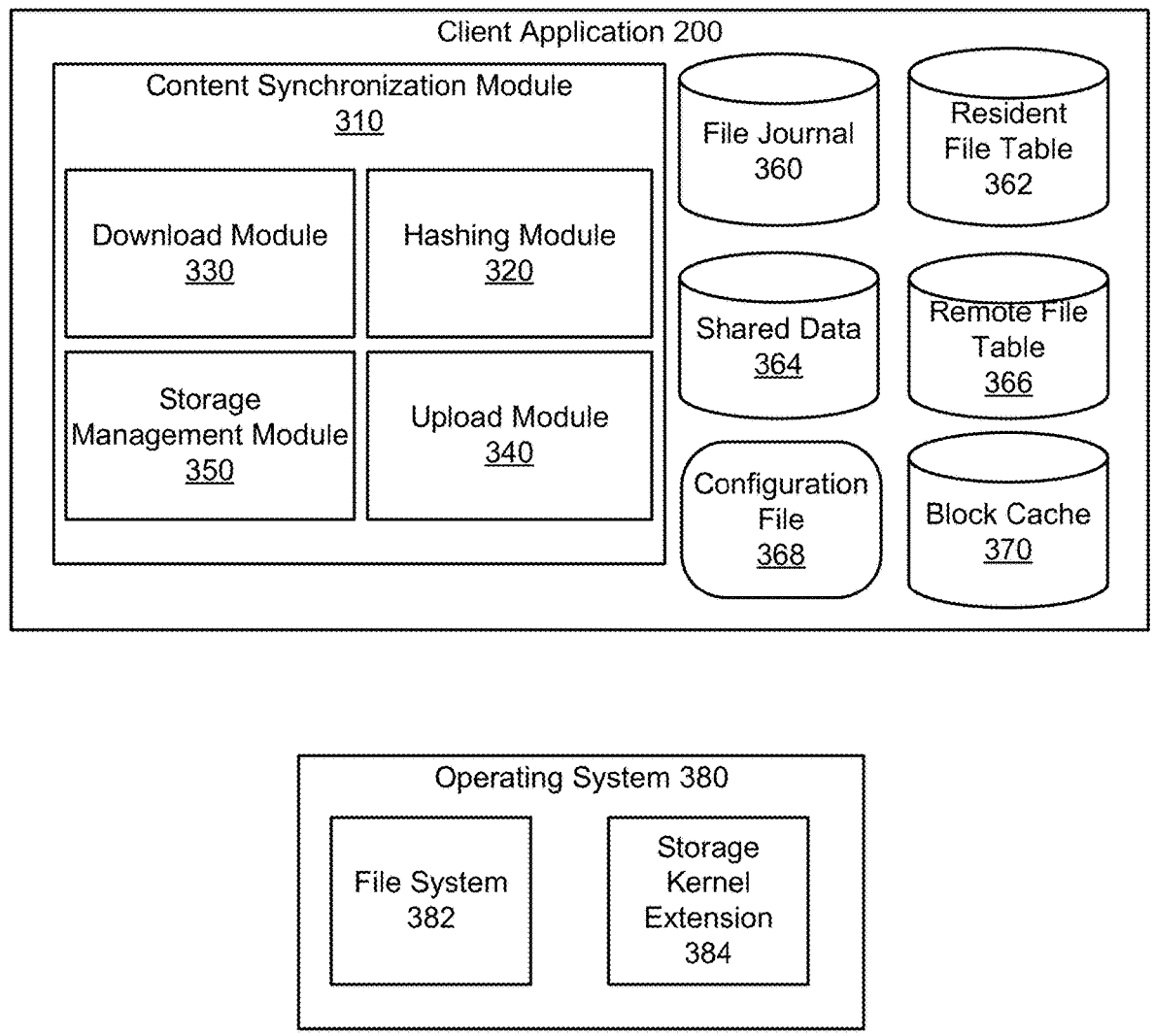
FIG. 3 illustrates the software architecture of a client device.

FIG. 3 shows modules of client application 200. Client application 200 includes various modules and data stores for synchronizing data with content management system 110. Client application 200 includes content synchronization module 310, hashing module 320, download module 330, upload module 340, and storage management module 350. Additionally, the client application 200 maintains data stores including a file journal 360, a resident file table 362, shared data 364, a remote file table 366, a configuration file 368, and a block cache 370. In addition to client application 200, FIG. 3 also indicates the storage kernel extension 384 present on the operating system of the client device. The configuration of client application 200 and its associated kernel extension using these modules instantiates client application 200 as a particular computer able to perform the functions described herein, which enables the described improvements in the storage capacity and functional performance of the client device.

Shared data 364 are data that have been synchronized with content management system 110, and includes content items received from content management system 110. When users add, modify, or delete content items in shared data 364, those changes are synchronized with content management system 110. The hashing module 320 and the block cache 370 work to identify blocks that comprise content items being uploaded to content management system 110. The hashing module assigns a block identifier by performing any suitable hashing algorithm, such as MD5 or SHA-1. Content synchronization module 310 then uses these identifiers to compare the resident blocks located in the block cache 370 with the blocks maintained by content management system 110. These modules are present in the current embodiment but this block implementation is not required for the invention of storage constrained synchronization.

When data is modified or added to the shared data 364 on the client device 100 within the client application 200, the modifications to the shared data 364 are transmitted to content management system 110. Client device 100 is also configured to receive notifications from content management system 110. When the client device 100 receives a notification, client device 100 queries content management system 110 for modifications to shared data 364. When the shared data is modified, the client device 100 requests the modifications from content management system 110 to store shared data on client device 100. In some cases, the modified data may be associated with a content item represented by a placeholder item. In this case, the client device 100 may withhold the request for modified data from content management system 110 until access to the content item represented by the placeholder item is requested by an application on the client device 100. Alternatively, when a shared content item is modified by another client device 100, content management system 110 may request that the constrained client device 100 restore the content item represented by a placeholder item such that the modification can be synchronized at the expense of other content items resident on the constrained client.

Within the client application 200, the file journal 360 stores a table listing metadata for all content items accessible to the account using the client application 200. Metadata includes revision date and time, namespace, and blocklists corresponding to each content item. Content items that are not resident or not synchronized are still included in the file journal 360.

The resident file table 362 stores a list of files that are always kept resident on the client device 100, without regard to storage constraints.

The remote file table 366 stores a list of files that have been selected to be deleted from the client device and replaced with placeholder items. These files are only maintained by content management system 110 and possibly other users with access to the file.

The configuration file 368 is a file maintained by the client application 200 and contains the storage allocation 120 for the client device. In some embodiments the storage allocation 120 can be created by the user or computer systems that may have control over the client application 200. For example an operating system may change the storage allocation 120 so that it can maintain a sufficient amount of storage for use by other applications.

The storage kernel extension 384 is configured to monitor requests from applications to the operating system 380 for access to content items, and determine whether or not the requested content items are placeholder items, and is one means for performing this function. The storage kernel extension 384 constitutes a direct modification to the structure and function of the operating system that enable the increase in the effective storage capacity on the client device.

The kernel extension 384 monitors requests made to open content items managed by the client application 200. The kernel extension 384 determines when requests are made to open content items managed by the client application 200 by monitoring the file system 382 on the operating system 380. When a request for a content item is made within the file system 382, the kernel extension 384 examines the pathname of the content item to determine whether it is within the content items stored within the shared content storage directory 120.

The kernel extension 384 determines whether the requested content item is a placeholder item by determining whether its size is under a threshold size. Alternatively, identification of a placeholder item can be completed based upon extended file attributes for content items managed by the client application 200. A file attribute indicating a placeholder item could be assigned to placeholder items such that the kernel extension could identify a placeholder item without examining the requested content item's size. If the file is determined to be a placeholder item by the kernel extension 384, the kernel extension communicates the identification information to the client application 200.

Figure 4:
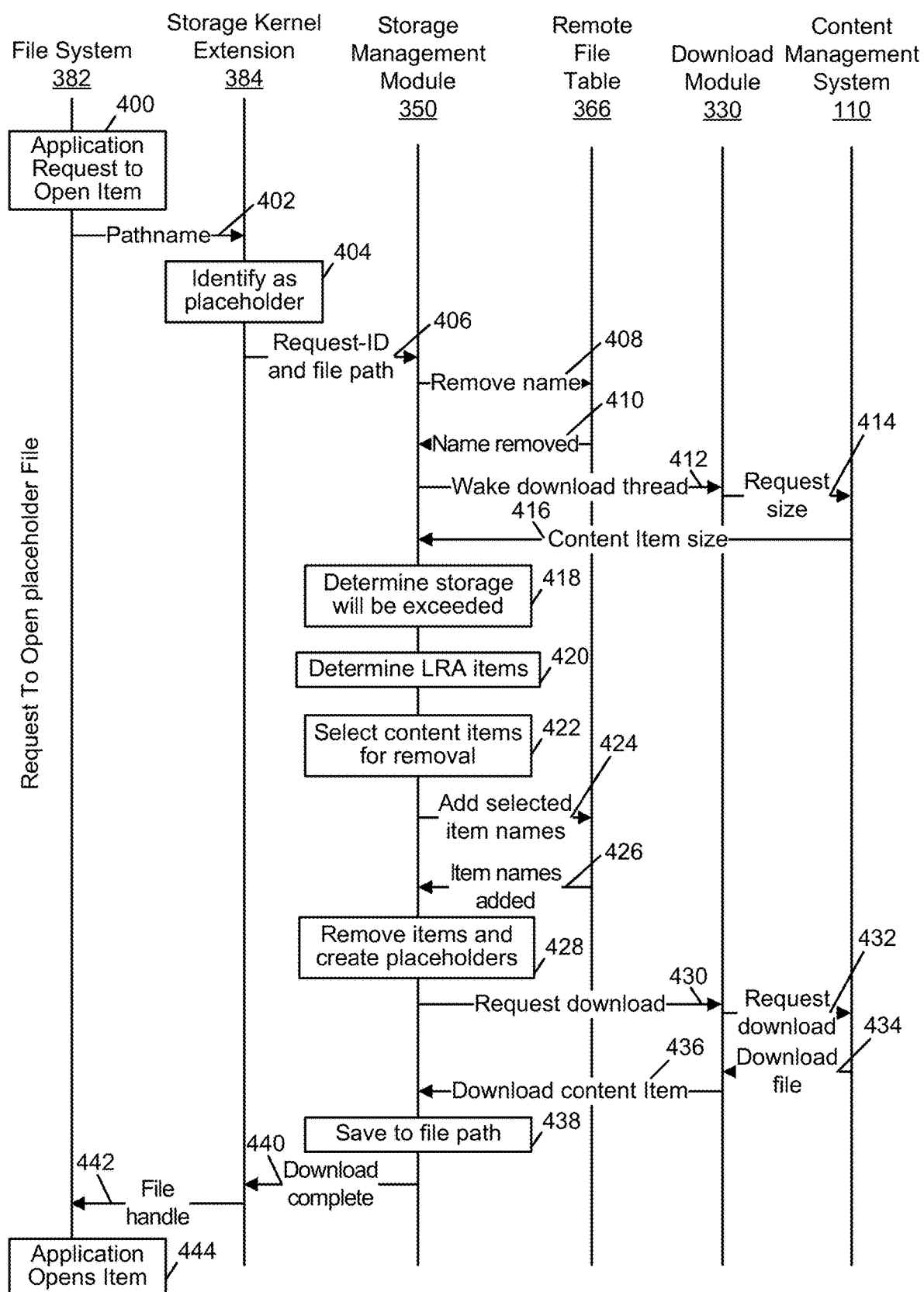
FIG. 4 is an interaction diagram of constrained synchronization for accessing an existing content item in the local content directory.

FIG. 4 is an interaction diagram showing one embodiment of a process for accessing a content item not resident on the client device 100 but included in the file system as if the content item was resident on the client device 100. The file system 382 receives 400 a request to open a content item within a synchronized folder on the client device 100. The request may come from any application, such as a file explorer, word processor, document reader, image editor, or the like. The storage kernel extension 384 intercepts 402 such file system requests, and obtains the pathname of the requested content item. The storage kernel extension 384 uses the pathname to determine 404 whether the content item is a placeholder item. The storage kernel extension 384 may do this by checking the size of the requested content item to determine if it is below a predetermined threshold, or otherwise consistent with the size of placeholder item (4 KB). Alternatively, the storage kernel extension 384 can read a file attribute extension that stores a value indicating whether content item is a placeholder item or a regular content item. If the content item is not a placeholder item, then the storage kernel extension 384 allows the request to continue as normal and gives the file handle to the file system so that the content item can be opened.

Upon determining that the content item is a placeholder item, the storage kernel extension 384 sends 406 the request identification number (information about the request including the request type) and the file path to the storage management module 350, passing in the file name. The storage management system 350 removes 408 the file name from the remote file table 366. The storage management system 350 then wakes 412 the download thread, which checks content items that require synchronization from content management system 110. As the requested content item has been removed from the remote file table 408, the download thread can now request 414 content item information from content management system 110, including the size of the requested content item in preparation for the download. The storage management module 350 receives 416 the size information from content management system 110, and determines 418 whether storing the content item on the client device 100 will cause the predetermined storage limit to be exceeded. If the storage limit will be exceeded by the addition of the requested content item, the storage management module 350 selects 422 one or more content items stored on the client device 100 for removal. However, if the storage limit will not be exceeded, the storage management module 350 proceeds to download 430 the content item.

In the case that the storage allocation 130 will be exceeded by the addition of the requested content item to the shared content storage directory 120, the storage management module 350 selects one or more content items to remove, so as to make available sufficient storage space for the requested content item before requesting a download 430 thereby preventing the shared content directory from ever occupying greater than it's allocated space. The storage management module 350 selects 422 content items for deletion by first determining 420 the unattended content items, using any of the UCSM described above. Where the access history of particular content items or other information pertaining to each selection method are stored on the host system, a request is made to the host system (not shown in FIG. 4) to update the client application's 300 version of this information. Once the current version of the access history or any other required information for each content item in content management system 110 has been obtained, the storage management module 350 can determine 420 the unattended content items.

The storage management module then selects 422 unattended content items for removal from the client device. In this embodiment, to select 422 content items to remove, the storage management module 350 traverses the queue generated by the UCSM in use to create storage space at least as large as the size of the requested content item to be downloaded. The selection of the unattended content items for removal can be conducted using any of the methods described above.

Figure 8:
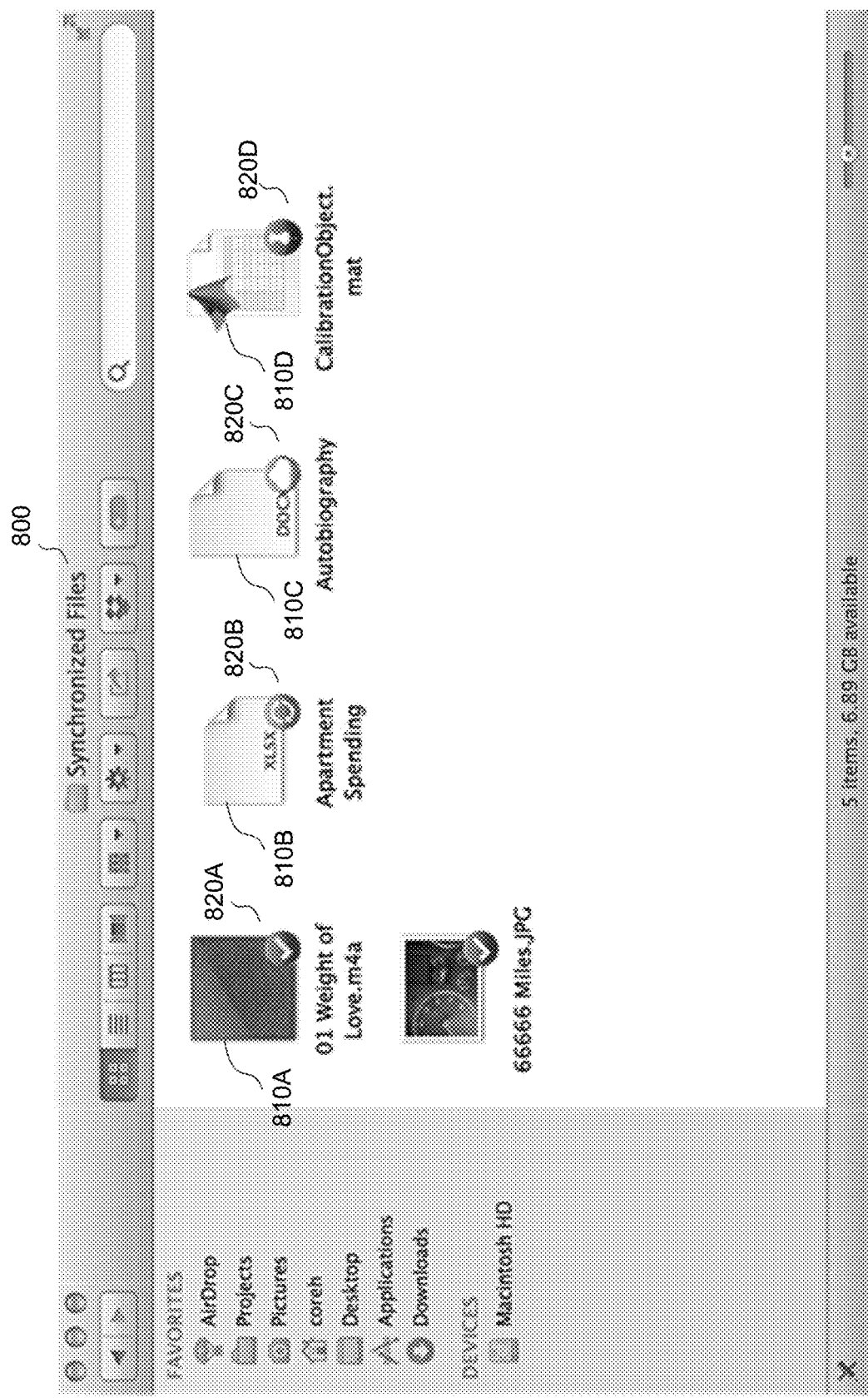
FIG. 8 is an illustration of a user interface for a local content directory with icons representing remote and local content items.

The storage management module 350 then adds 424 the names of the selected content items to the remote file table 366. Once this addition 424 has been confirmed 426, the storage management module 350 removes 428 the selected content items from shared content storage directory 120 on client device, and then creates, for each removed content item, a corresponding placeholder item that has the same metadata and location as the removed content item, but does not contain the content information for the content item. Placeholder items may be represented in the user interface of the client as if they are still resident on the client device 100. FIG. 8 illustrates an example of how placeholder items may be represented in the user interface of the client device 100.

Upon removal of the selected content items, there will be sufficient storage space on the client device 100, and the requested content item can be downloaded from content management system 110 without exceeding the storage limit for the shared content storage directory 120. Accordingly, the storage management module 350 sends a download request 430 to the download module 330. The download module 330 then initiates a download 432 with content management system 110. Once the content item is downloaded 434 to the download module 330 it is passed 436 to the storage management module 350, which saves 438 the requested content item to the previously identified location and notifies 440 the storage kernel extension 384 that the download is complete. In one embodiment, the storage management module 350 appends the contents of the downloaded content item to the placeholder item metadata, and updates the content item attributes to indicate that content item is now no longer a placeholder item. This enables the requesting application to transparently access the requested content item, using the same file handle and identification information it used to initially request access to the content item. The storage kernel extension 384 then passes through the file handle 442 to the file system 382, which gives the requesting application permission to open the content item 444.

Figure 5:
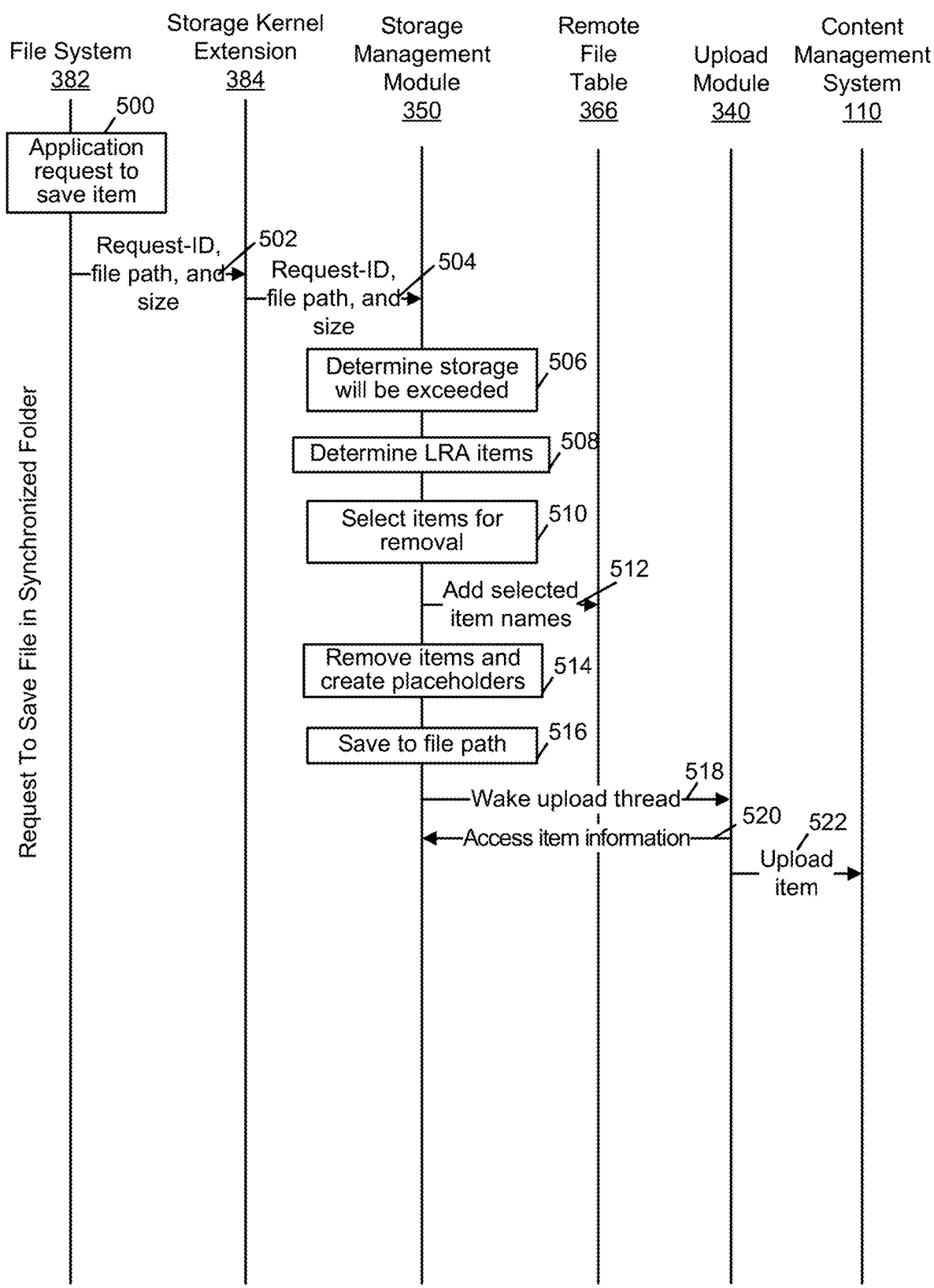
FIG. 5 is an interaction diagram of constrained synchronization for creating a new content item to be stored in the local content directory.

FIG. 5 is an interaction diagram showing one embodiment of a process of saving a content item to shared content storage directory 120 that is approaching its storage allocation 130. The content item can be a newly created content item in the shared content storage directory 120, a content item that has been relocated into the shared content storage directory 120, or a content item that was already in the shared content storage directory 120, and then modified in such a way to increase its size. The process begins with an application making a request 500 to the operating system's file system 382 to save a content item within the synchronized folder. The storage kernel extension 384 monitors this request and receives 502 the request-ID, file path, and size from the file system. The storage kernel extension 384 then sends 504 this information to the storage management module 350. The storage management module determines 506 whether the addition of the new content item will cause the synchronized folder to exceed its storage limit. If the storage limit will not be exceeded, the file system 382 is allowed to save the content item as normal. In the case that the storage limit will be exceeded, the storage management module 350 determines 508 the unattended content items and selects them for removal from the client device. Once the unattended content items are selected their names are added 512 to the remote file table 366 so that their content will not be synchronized by content management system 110. The storage management module then removes the selected content items from the client device 100 and replaces 514 them with placeholder items, which have the same metadata and location as the removed content items but contain no content. When this process is complete there is sufficient storage space in the constrained folder for the storage management module to allow 516 the original content item to be saved. The storage management module then wakes 518 the upload thread, which accesses 520 the metadata so that the contents of the saved content item are uploaded 522 to content management system 110.

In addition to automatically removing content items and creating placeholder items, some embodiments also allow for the user to select particular content items to be stored only remotely on content management system 110. This may be implemented by simply allowing the user to select from a context menu (e.g., "right-click") on a particular synchronized content item. The client application 200 would then present the user with an option to make the selected content item remote. If the user chooses this option the content item is removed from the client device 100, the name of the content item is added to the remote file table 366, and a placeholder item with the same metadata and location of the original content item is created to represent the original content. If the user wants to access the content item in the future the same process described in FIG. 5 may be used to retrieve the content item from content management system 100.

In some embodiments, the client device is configured to enable the user to select particular content items to remain resident on the client device when the storage allocation 130 is reached regardless whether the UCSM in effect would otherwise select them for removal from the client device 100. This embodiment offers operational improvements that allow the user to maintain quick access to particularly important content items. In this embodiment, the client application 200 enables the user to access a context menu, and then select an option to force a content item to remain resident on the client device 100. Upon selecting, the name of the content item is added to the resident file table 362. The resident file table 362 is subsequently accessed during the UCSM used by the storage management module 350 shown in 422 and all content items in the table are excluded from the selection process. For example, when a given content item is selected for removal, the resident file table 362 is examined to determine if the selected content item is listed therein; if so, the selected content item is ignored, and another content item is selected by the UCSM in effect.

Because the content associated with placeholder items on a client device 100 is not being synchronized it may make content management more complicated. For example, if a user on one client device moves a content item that is represented as a placeholder item on a second client device then, if the second client device is not receiving synchronizing data regarding the placeholder item, its location may change on the first client device but not on the other. For example, a content item may be deleted from content management system 110 completely by one client device 100 while represented by a placeholder item on a different client device 100. If this situation occurred the user of the second client device 100 may try to access the content item represented by placeholder item only to find that it no longer existed. To avoid these confusing circumstances, in some embodiments, the content management system 110 is configured to synchronize placeholder items for metadata only; that is, if any of the attributes of a placeholder item change, content management system 110 will synchronize the modified attributes to all client devices 100 with access to that content item regardless of whether the content item is represented as a placeholder item on any of those client devices. Thus, if a content item is deleted from one client device, the placeholder item representing that content item is deleted as well on any other client device 100. Alternatively in some embodiments, if a content item is modified on another client device such that its size changes so it can fit within the remaining storage in the shared content storage directory 120 on a client device 100 it may be downloaded to the client device 100 even if access to the content item is not requested.

Figure 6:
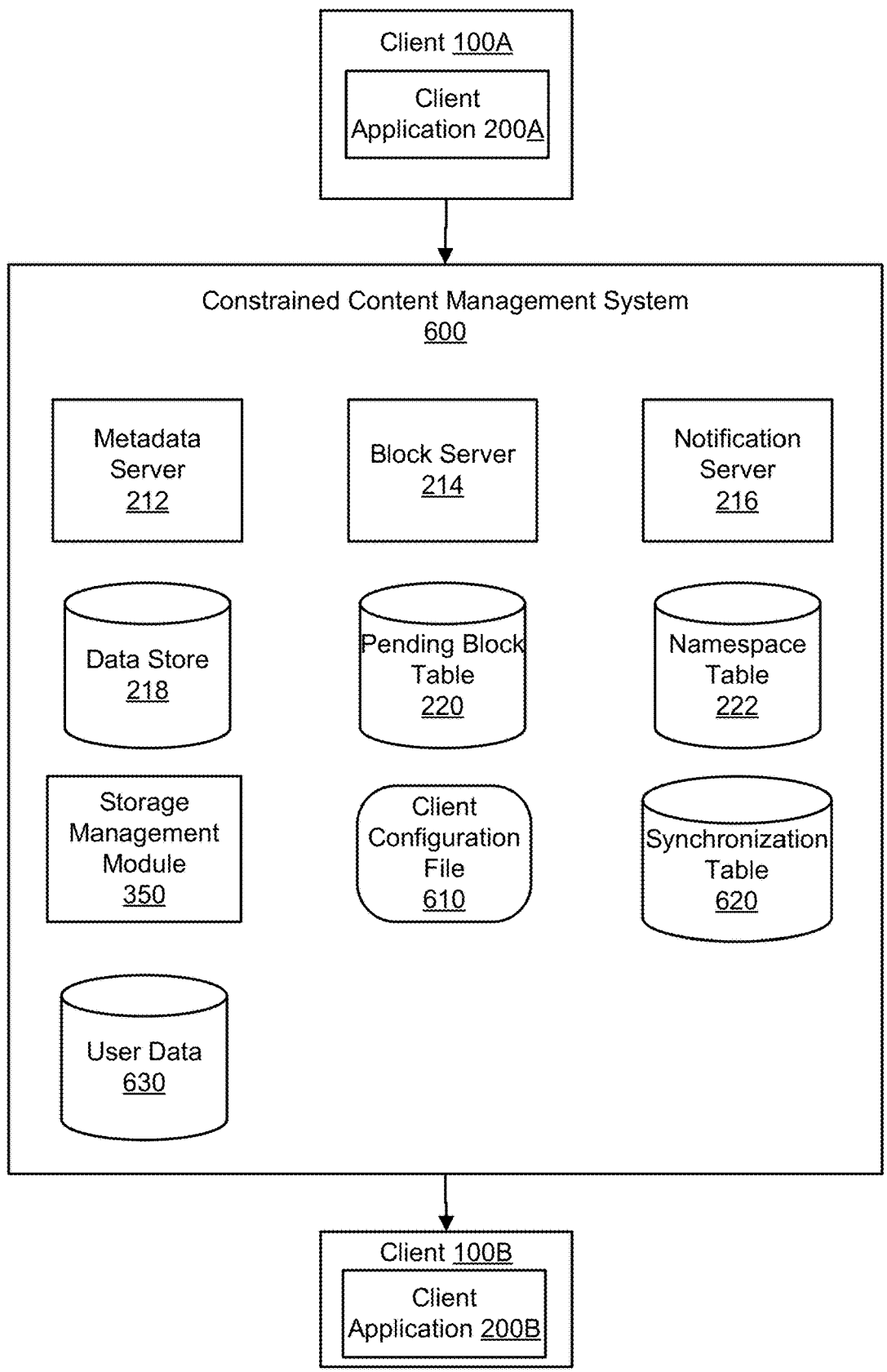
FIG. 6 illustrates a system environment for host based constrained synchronization.

Some of the foregoing embodiments represent client-based constrained synchronization systems as the client application 200 is responsible for ensuring that the predetermined storage allocation 130 is not exceeded and for requesting data from the content management system 110. In a host-based embodiment, illustrated in FIG. 6, content management system 110 manages the constrained synchronization process, including maintaining information identifying the remote and resident content item information for each client device 100. A host-based embodiment may provide the same benefits of increasing effective storage capacity on a client device 100, while reducing the computation needed from the client device, thereby improving client device 100 performance in comparison to other embodiments. The constrained content management system 600 includes elements of content management system 110 shown in FIG. 2, further modified to utilize the storage management module 350 along with the necessary data files required for the storage management module 350 to function properly. Within the constrained content management system the metadata server 212, block server 214, notification server 216, data store 218, pending block table 220, and namespace table 222 function in the same manner as implemented in content management system 110. Additionally, storage management module 350 functions in a manner similar to when it is resident on the client device, where it is responsible for determining when the storage space limit will be exceeded and appropriately creating placeholder items. The storage management module 350 is also responsible for receiving information from the client device 100 about requests made by the operating system 380. When a request is made to open one or more content items information about the request is sent to the content management system 110 to be monitored remotely by the storage management module 350 so that the required downloads are made to provide access to placeholder items on the client device 100. The storage management module 350 uses the client configuration file 610 to provide information regarding the storage configurations on each client device associated with the constrained content management system. The synchronization table 620 is a record of all content items on client devices that require synchronization with the constrained content management system 600; the content items included in this table would be a subset of the content items located in the data store 218 since some of the content items are placeholder items and require only metadata synchronization. Further, in this embodiment, the synchronization table 620 may be replaced by using both a resident file table 362 and a remote file table 366 configured such that they indicate the client devices 100 on which each content item should be kept remote or resident. For an embodiment using the latter configuration, implementation of metadata synchronization for placeholder items is easier as the placeholder items are identified directly in the remote file table 366 of each client device 100. User data 630 is stored on the constrained content management system 600 so that the storage management module 350 can determine the unattended content items.

Figure 7:
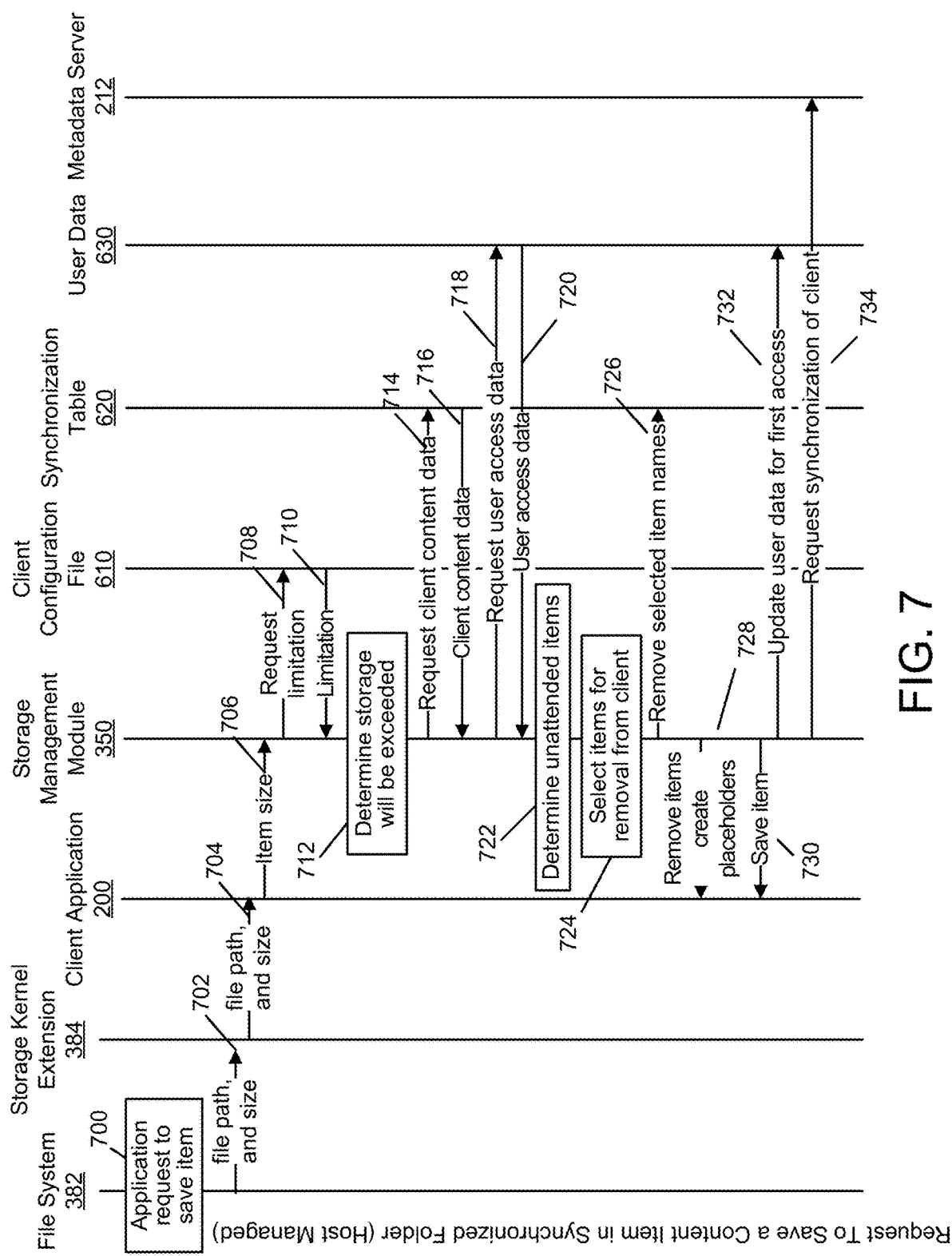
FIG. 7 is an interaction diagram of constrained synchronization managed by a host device.

FIG. 7 is an interaction diagram illustrating one embodiment of a process of a host managed constrained storage synchronization. An application on a client device requests 700 for a content item to be saved to the synchronized folders on the client device. The storage kernel extension records 702 the request ID, file path, and content item size and transfers 704 the information to the client application 200. The client application 200 forwards 706 the content item size information to the storage management module 350 on the constrained content management system 600. The storage management module 350 requests 708 the storage limitation for the particular client from which it received 706 the content item size information from the client configuration file 610. The storage management module 350 determines 712 that the storage limit will be exceeded by comparing the size in addition to the other content items resident on client device 100 to the storage allocation received from the client configuration file 610. The storage management module 350 requests 714 the content data on the client from the synchronization table 620 so that it may select content items to remove from the client from the synchronized content items on the client. The synchronization table responds 716 with the synchronized content data for the particular client. The storage management module 350 requests 718 user access data from user data 630 stored on a host device to use to determine LRA content items. Once this data is received 820 from the user data table 630. The storage management module 350 can determine 722 the LRA content items and select 724 those that should be removed from the client to provide the required storage space. The storage management module 350 sends requests to remove content items and create placeholder items 728 to the client application 200. It gives 730 permission to the client application 200 to complete the original request 700 to save a content item. Finally the storage management module updates 732 the user data to reflect the first content item access for the saved content item and then requests 734 synchronization of the client device 100 from the metadata server 212 since a new content item is available for upload.

FIG. 8 illustrates an example a user interface of client device 100 operating in coordination with a content management system providing constrained synchronization. A synchronized files folder 800 serves as the shared content storage directory 120. Folder 800 contains a number of content items, each represented by a corresponded icon 810A, a .m4a music file, 810B, a .xlsx spreadsheet, 810C, a .docx word processing file, 810D, a .mat Matlab file, and 810E, a .jpg image file. Each icon 810 is overlaid with a status icon 820 that indicates the storage status of the content item.

Status icon 820A ("check icon") indicates that the content item is currently resident on the client device 100 and is synchronized with the current version of the content item maintained by content management system 110.

Status icon 820B indicates that the content item will be resident on the client device 100 once synchronization with content management system 110 is complete.

Status icon 820C indicates that the content item is a placeholder item and is not currently resident on the client device but still maintained on content management system 110.

Status icon 820D indicates that the content item is resident on the client device and synchronized with its version maintained by content management system 110. Additionally, the green circle with the pin icon 840 indicates that the content item has been chosen to remain resident on the client device 800 during a storage constraint.

Figure 9:
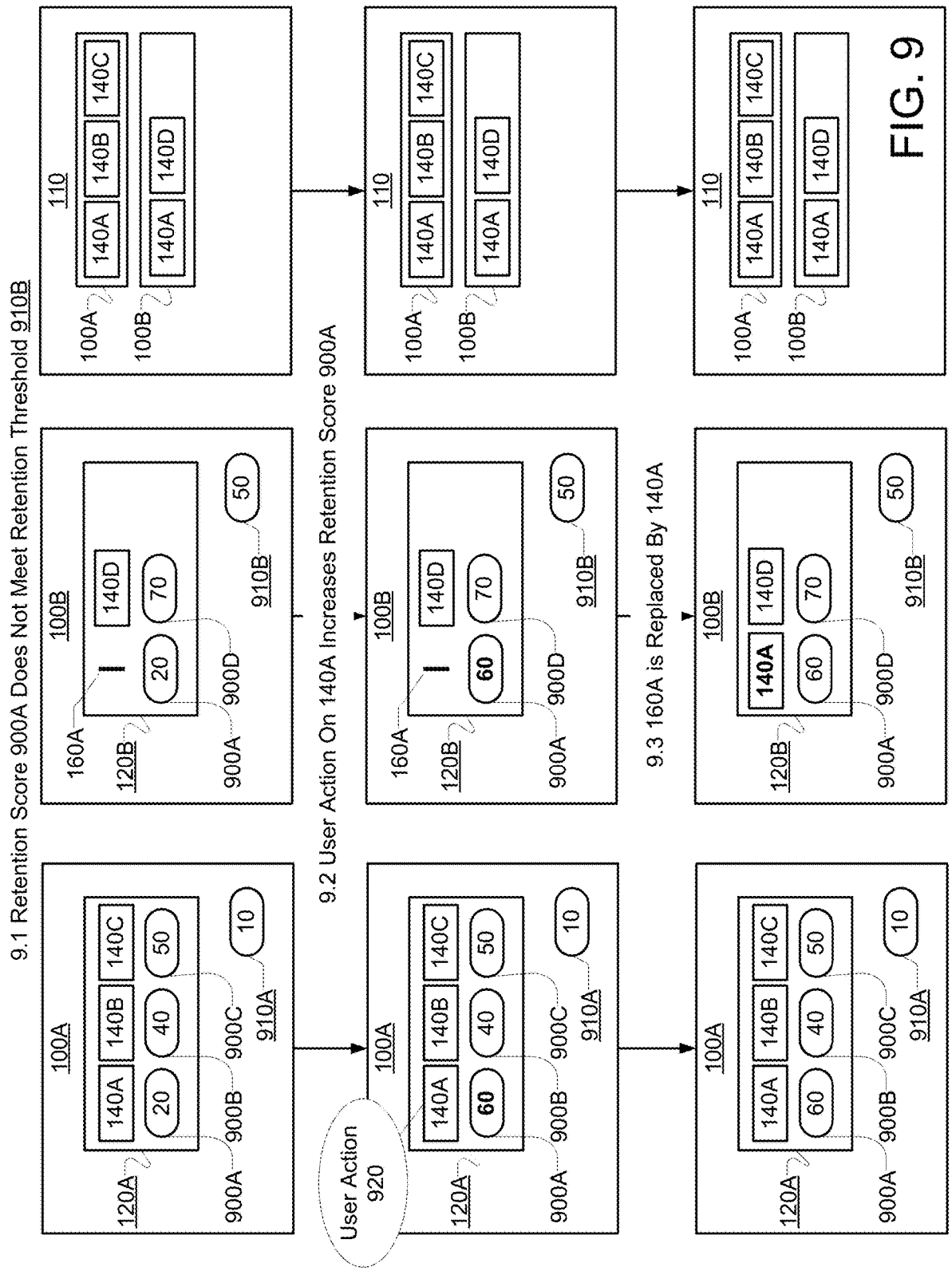
FIG. 9 is a concept diagram illustrating constrained synchronization using predicted content item importance.

FIG. 9 is a concept diagram illustrating an alternate embodiment of constrained synchronization, which predicts user access to particular content items remote to a client device, and downloads the predicted content items in advance of the access. This approach offers a further improvement in the operation of the client device by eliminating in most cases the time a user may have to wait to retrieve the content item over the network from content management system 110. A retention score 900 is calculated for each content item 140 within a shared content storage directory 120. This score is a measure of the predicted importance of a content item and can be calculated as a function of latest access time, or a number of other factors determined to be predictive of a user request, as explained in a later section. Additionally, each content storage directory 120 is configured with a retention score threshold 910, which may be specified by the user or set at a predetermined value. Whenever the predicted importance of a content item, as measured by the retention score 900 of the same content item, exceeds the retention score threshold 910 of a particular shared content storage directory 120 on a client device 100 with access to the content item, the content item is downloaded to the shared content storage directory when it is remote to the client device and maintained within the shared content directory if it is resident on the client device.

Stage 9.1 illustrates a typical state of a content management system, which predicts user access to content items. In this illustration, content management system 110 manages two client devices 100A and 100B. Shared content storage directories 120A and 120B are located within their respective client devices. Shared content storage directory 120A stores content items 140A, 140B, and 140C while shared content storage directory 120B stores content item 140D and a shadow item representation 160A of content item 140A. Synchronized versions of all content items 140 are stored on content management system 110.

Additionally, each content item 140 has a corresponding retention score 900, where 900A is the retention score for content item 140A, 900B is the retention score for content item 140B and so forth. Each shared content storage directory is also configured with a retention score threshold 910, where 910A is the retention score threshold for shared content storage directory 120A and 910B is the retention score threshold for shared content storage directory 120B.

In stage 9.1, content item 140A is not maintained in shared content storage directory 120B. Though in this case there are no content items resident within a shared content storage directory 120 that have a retention score 900 lower than the retention score threshold 910, this scenario is possible if traits from other embodiments, described previously or in a following section, are used in addition to those from this embodiment. For example a storage allocation may still be in affect and so if the storage allocation is sufficiently large it may not be necessary to keep a file remote even if it has a retention score 900 lower than the retention score threshold 910.

In stage 9.2, a user of client device 100A performs a user action 920 on content item 140A that is considered an access to content item 140A. Because, in this example, retention scores 900 are calculated as a function of latest access time, the retention score 900A of content item 140A increases from 20 to 60 (The magnitude of this change is arbitrary for the purpose of this example. Details on retention score calculation are provided later and may not result in the same score change).

In stage 9.3, the content management system 110 or, in some embodiments, the client application on client 100B, determines that the retention score 900A of content item 140A is greater than or equal to the retention score threshold 910B of the shared content storage directory 120B where content item 140A is remote. Because the retention score 900A exceeds the retention score threshold 910B, the content item 140A is downloaded to client device 100B and stored in shared content storage directory 120B.

Similar to the UCSMs there are a number of retention score calculation methods. Generally retention scores can be normalized against user behavioral attributes, resulting in retention scores for the same content item that are different for each client device, or global so that scores are the same for each client device. The advantage of normalized retention scores is that they level out differences in user behavior. For example, if the retention score is a function of the latest access time of a content item where the score increases as the time between the present time and the latest access time decreases, a more active user would drive up the retention scores of content items shared with that user when compared to content items shared with a less active user. If the retention scores are not normalized for a third user, sharing with both the active user and the less active user, the retention scores would lose their predictive quality as only the items from the active user would have the highest retention scores even though a recent access by the active user is less predictive of an access by the third user than is a recent access by the less active user. Whenever a retention score is normalized it can be normalized to an attribute of a particular user or a particular content item.

The following methods are examples of methods for determining a retention score, or a score predicting a user access of a content item. Additionally, a retention score may use a combination of the following methods to create the most predictive measure of predicted importance. Typically the retention score increases as the predicted importance of a content item increases, however the opposite can be true if convenient for an embodiment. In this case the corresponding retention score threshold would be a minimum value where if the retention score of content item was less than or equal to the retention score threshold it would be downloaded to the corresponding shared content storage directory. For the purposes of this discussion the default case of an increasing retention score will be assumed.

Latest Access Scoring: For latest access scoring the retention score of a content item is a function of the latest access time of that content item. The retention score could simply be the inverse of the difference between the current time and the latest access time in seconds:

$$RS = \frac{1}{t_C - t_A}$$

where RS is the retention score, $t_C$ is the current time, and $t_A$ is the latest access time.

If normalization is needed for the particular embodiment a variety of user attributes may be used such as a user's or client device's access frequency defined as the number of accesses of any shared content item by a particular user or on a particular client device within a predetermined time period. Alternatively, the average latest access time of content items shared with a particular user or client device may be used.

Access Frequency Scoring: For access frequency scoring, the retention score of a content item increases with an increase in the number of accesses to the same content item within a predetermined time period. To normalize access frequency scoring the access frequency for a given content item could be divided or otherwise scaled by the average access frequency for all content items on a client device or shared with a user.

Location Related Access Scoring: For location related access scoring, the retention score of a first content item is a weighted combination of the latest access time, access frequency, or any other characteristic of the content item itself and the same characteristic of additional content items stored in the same folder as the first content item. This implies that accesses to content items within a folder are predictive of accesses to other content items within the same folder.

Similar Access Scoring: For similar access scoring, the retention score of a first content item is a weighted combination of the latest access time, access frequency of the content item itself and the same characteristic of additional content items with similar attributes as the first content item. Attributes may include content item type, size, location, users with access to the content item, etc. This implies that accesses to similar content items are predictive of future accesses to a content item.

Criteria Based Retention Scoring: For criteria based retention scoring, the retention score of a content item is based on the number of previously identified predictive criteria satisfied by the content item. For example, access to a content item by another user within 24 hours, an access frequency greater than 5 accesses in the last week, and accesses to sufficiently similar content items within the last 3 days may all be criteria predetermined to be predictive of an attempt to access a remote content item within the next 6 hours. Therefore, the retention score of a content item may increase by a predetermined magnitude for each of the criteria satisfied by the content item. The magnitude of the increase for a particular satisfied criterion may be proportional to the predictive strength of the particular criterion.

Figure 10:
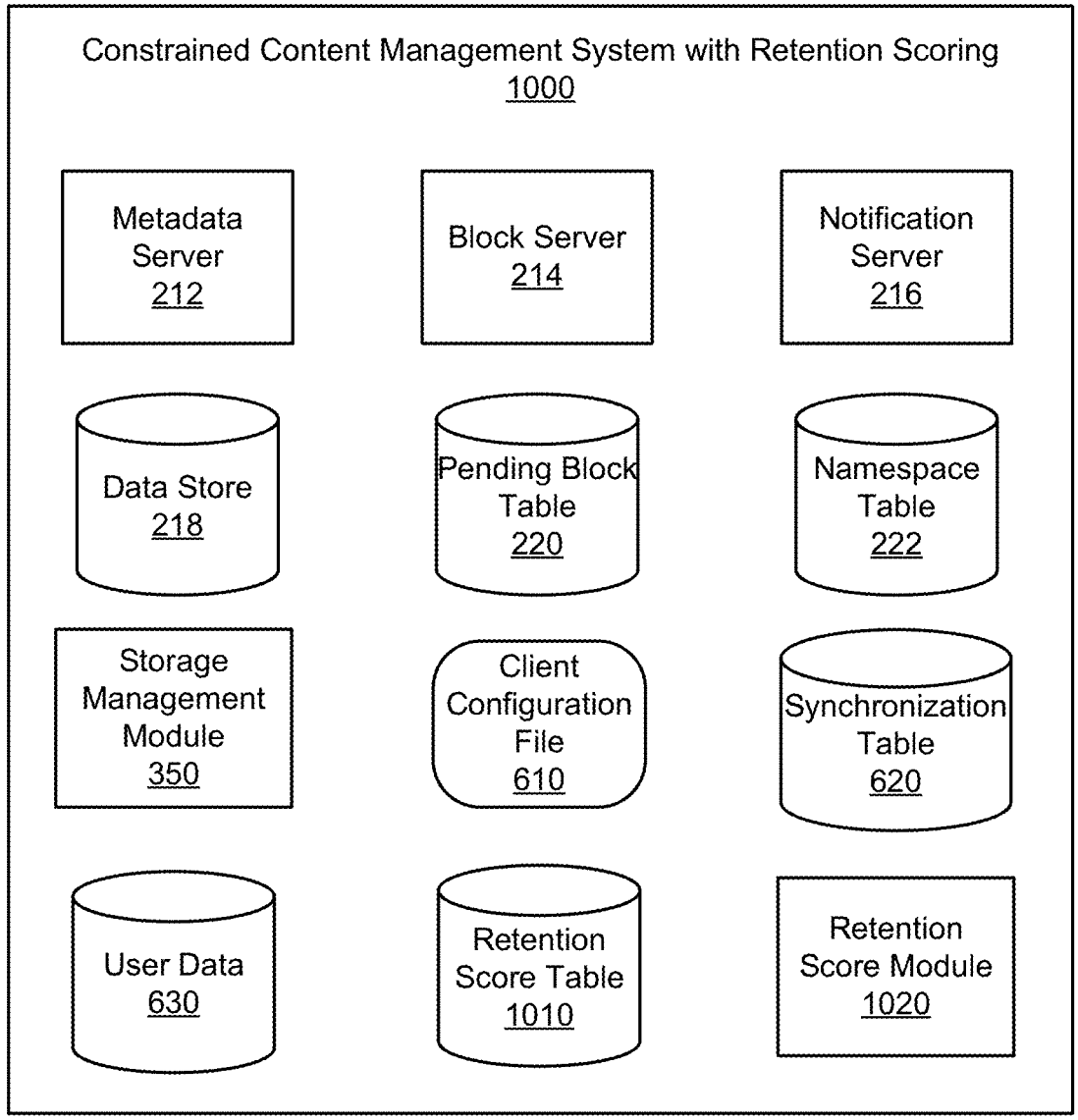
FIG. 10 illustrates a system environment for a content management system using predicted content item importance for constrained synchronization.

FIG. 10 illustrates a system environment for a content management system using predicted content item importance for constrained synchronization. Most of the modules of the constrained content management system 600 that are present in FIG. 10 perform similar or identical functions to those described with reference to FIG. 6 except where noted in the foregoing section. Therefore, the functions of all modules within content management system 1000 are not explained in detail in this section.

Content management system 1000 includes metadata server 212, block server 214, notification server 216, data store 218, pending block table 220, namespace table 222, storage management module 350, client configuration file 610, synchronization table 620, user data 630, retention score table 1010, and retention score module 1020. Client configuration file 610 and user data 630 have significant changes over previous versions described in FIG. 6. Client configuration file 610 is modified to include the retention score threshold for each shared content storage directory of each client device, while user data is modified to include user data relevant to the retention scoring method being used. The retention score module 1020 takes in user data 630 and data from the data store 218 to generate the retention score table 1010. The retention score table is a table enumerating the retention score of each content item managed by the content management system 1000. A separate retention score table may exist for each client device if normalization is being used to calculate retention scores. Whenever the retention score of a content item is updated, the retention score module 1020 consults the client configuration file 610 and the synchronization table 620 to determine if the corresponding content item to the recently changed retention score is remote on any client devices and if it exceeds any of the retention score thresholds of those client devices. If a retention score threshold is exceeded the retention score module requests that the storage management module 350 perform the necessary download and replacement of the representing shadow item.

Figure 11:
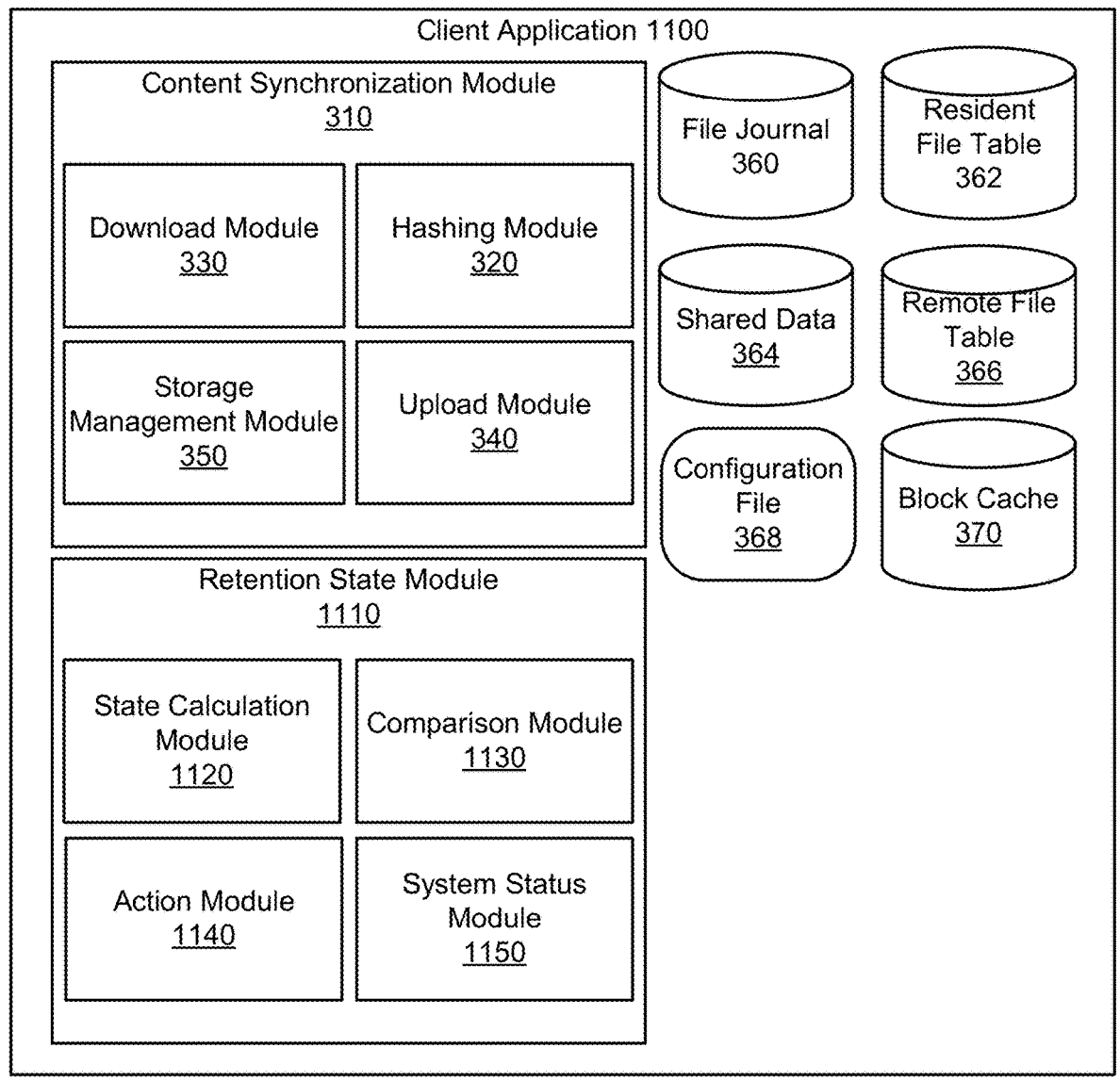
FIG. 11 illustrates the software architecture of a client device using idle state triggered content management.

FIG. 11 illustrates the software architecture of the client application 1100 for another embodiment of constrained synchronization. This embodiment conducts all downloading of remote content items, removal of unattended content items, and creation of shadow files while the client device is determined to be idle by the client application. This change in timing of the constrained synchronization process improves the client device by offering a functional improvement over the previously described embodiments while providing a similar increase in effective storage capacity. To perform these functions the idle state triggered embodiment modifies the system architecture illustrated in FIG. 3. In this embodiment, client application 1100 is comprised of content synchronization module 310, retention state module 1110, file journal 360, resident file table 362, shared data 364, remote file table 366, configuration file 368, and block cache 370. The content synchronization module 310 is further comprised of hashing module 320, download module 330, upload module 340, and storage management module 350. The retention state module 1110 is further comprised of state calculation module 1120, state comparison module 1130, action module 1140, and system status module 1150. Unless otherwise specified all previously mentioned modules and data tables have the same function as previously described slightly modified as one skilled in the art would recognize to accommodate the new modules. Any major modifications are explained below.

System status module 1150 uses storage kernel extension 382 to measure system activity on operating system 380. System activity can be measured using metrics for processor activity including but not limited to the number of non-idle processor cycles as a ratio of processor frequency or another CPU utilization metric (with or without adjustment for multiple processor cores), the number of threads, or the number of processes of a client device 100. Network activity metrics may also be used including network utilization, defined in bits per second or packets per second, as a ratio of the maximum speed for a particular port or connection. Additionally, memory usage metrics including the amount of available or free random access memory (RAM) may be used to measure system activity. The system status module 1150 may use the activity metrics mentioned above or any other suitable activity metrics, individually or in combination to measure overall system activity.

When the measure of system activity is below a predetermined activity threshold, the system status module 1150 reports to the retention score module 1110 that the client device is currently idle. This activity threshold may be defined as a percentage of the total computational resources of the client device, as defined by an activity metric, or the activity threshold may be defined as a particular value of an activity metric. For example, an activity threshold may be defined as the state of the client device 100 using less than 25% of available processing resources. Alternatively, the activity threshold may be defined as the state when the other processes of the client device 100 are, in total, using less than 2 GB of memory, or that there is at least 4 GB of total memory available on the client device.

When the client device 100 has been determined as being in an idle state by the system status module 1150, state calculation module 1120 determines the retention state of the shared content storage directory 120. Generally the retention state consists of the content items resident on the client device and a set of attributes corresponding to those content items. These attributes may include content item size, latest access time, access frequency, directory location, or any other suitable attribute that would be indicative of a content item's importance for retention on a client device. Additionally, the retention state could be represented by a set of statistics calculated using at least one of the attributes listed above.

Comparison module 1130 receives the retention state from the state calculation module 1120, it then compares the current retention state of the shared content storage directory 120 with a predetermined threshold retention state, defined in the configuration file 368, that may be specified by the user. The threshold retention state is a set of criteria pertaining to the attributes or calculated statistics of the client device included in the retention state. The comparison module 1130 determines whether the current retention state satisfies the criteria of the threshold retention state. If these criteria are violated (e.g. not satisfied), the comparison module 1130 reports the content items corresponding to the attributes, or the calculated statistics based on those attributes, that violate the threshold retention state criteria to the action module 1140.

Action module 1140 receives the report from the comparison module 1130. It then determines what actions will bring the retention state back to within the threshold retention state criteria. These actions may include removing content items from the shared content storage directory 120 and replacing them with shadow items, or replacing shadow items representing remote content items with the content items themselves. Once these actions have been determined, the action module 1140 requests that content synchronization module 310 complete the required actions.

Figure 12:
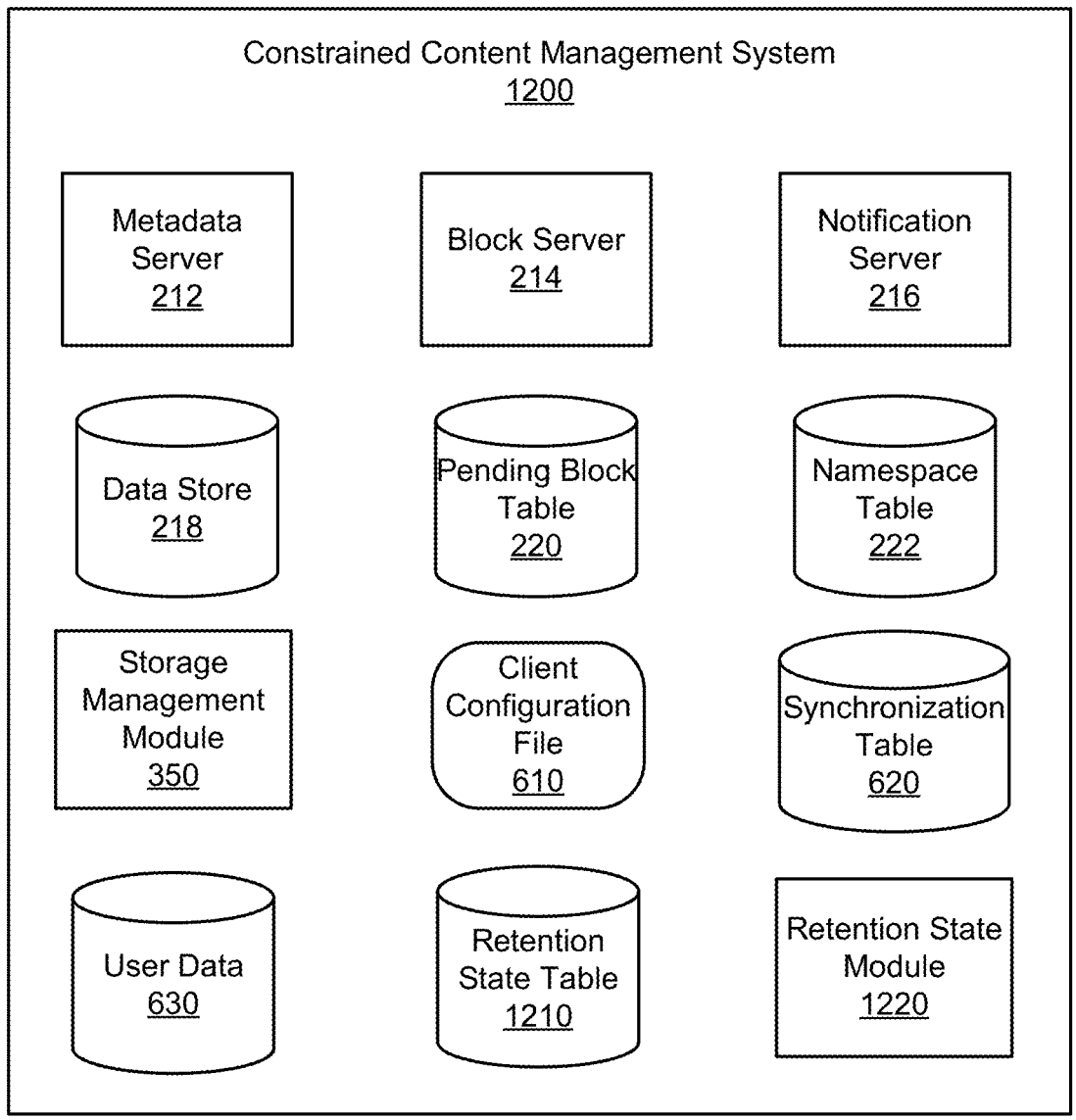
FIG. 12 illustrates a system environment for a content management system using idle state triggered content management.

Alternatively, idle state triggered constrained synchronization could be conducted by the content management system itself further reducing the computation burden on the client device and increasing device availability for other uses. FIG. 12 illustrates a system environment that completes this task. Constrained content management system 1200 is comprised of metadata server 212, block server 214, notification server 216, data store 218, pending block table 220, namespace table 222, storage management module 350, client configuration file 610, synchronization table 620, user data 630, retention state table 1210, retention state module 1220. Unless otherwise specified all previously mentioned modules and data tables have the same function as previously described slightly modified as one skilled in the art would recognize to accommodate the new modules. Any major modifications are explained below.

In this version of the embodiment, client application 200 on a client device connected to the content management system 1200 reports to the content management system 1200 on the status of the client device. When the client device is idle the content management system 1200 uses the retention state module 1220 to determine the retention state of the shared content storage directory 120 on the idle client device. The retention state module then updates the retention state table 1210, which contains the current retention state of all client devices connected to the content management system 1200. The retention state module 1220 then conducts steps similar to retention state module 1110 using potentially similar submodules, as described during the discussion of FIG. 11.

The retention state of a shared content storage directory can be determined using a variety of methods. Generally, the retention state is criteria based and is maintained periodically whenever the client application determines that the client device is idle. However, it is also possible to implement the retention state and threshold retention state numerically such that each state is represented by a statistic calculated using the attributes of the content items resident on the client device. If the retention state is criteria based, the threshold retention state is a set of criteria that the content items within the shared content storage directory must satisfy. Additionally, in the case of a criteria based retention state, the user may be given an option to choose the retention state criteria thereby allowing customization of the categories of content items resident on a client device 100.

The period used to check each client device can be a predetermined value of the content management system, set by the user, or determined based on usage patterns of the particular client device. For example, if a user accesses content items on their client device on average every 24 hours the period could be set to ensure that the shared content storage directory is maintained before 24 hours passes.

As an alternative to checking a shared content directory periodically, another embodiment could maintain a shared content directory only when the shared content directory satisfies a second set of criteria that indicate urgency, for example, nearing a hardware storage limit.

Storage Space Criteria: One possible set of criteria is to have a storage allocation criteria. For example, a storage allocation could be set at 20 GB but instead of behaving like the previous embodiments, the content management system would allow the content items stored on the shared content storage directory to exceed the criteria value (in this example 20 GB) until the device was idle. Then a similar process of determining unattended content items could be used to remove the appropriate content items and satisfy the storage space criteria for the shared content storage directory.

Access Time Criteria: A second criterion could be an access time criterion. For example, the criterion could state that no content item with a latest access time earlier than a predetermined time interval in the past can be resident within the shared content storage directory. These content items would be allowed to remain resident within the shared content storage directory until the client device was idle. At that point the retention state module would simply request the removal of all content items with a latest access time earlier than the predetermined time interval.

Content Item Size Criteria: Another set of criteria is the content item size criterion. For this method, a threshold on the individual content item's size is set. Therefore, whenever the device is idle any content item over or under that threshold is removed from residence on the client device.

Access Frequency Criteria: Finally an access frequency criterion is used to set a minimum number of accesses within a predetermined time interval required to remain resident on a client device. If a particular content item is not accessed frequently enough it is removed from the client device whenever it is idle.

Note that this list of retention criteria is not exhaustive. Additionally, these criteria may be used in conjunction with each other resulting in more complex rules.

Figure 13:
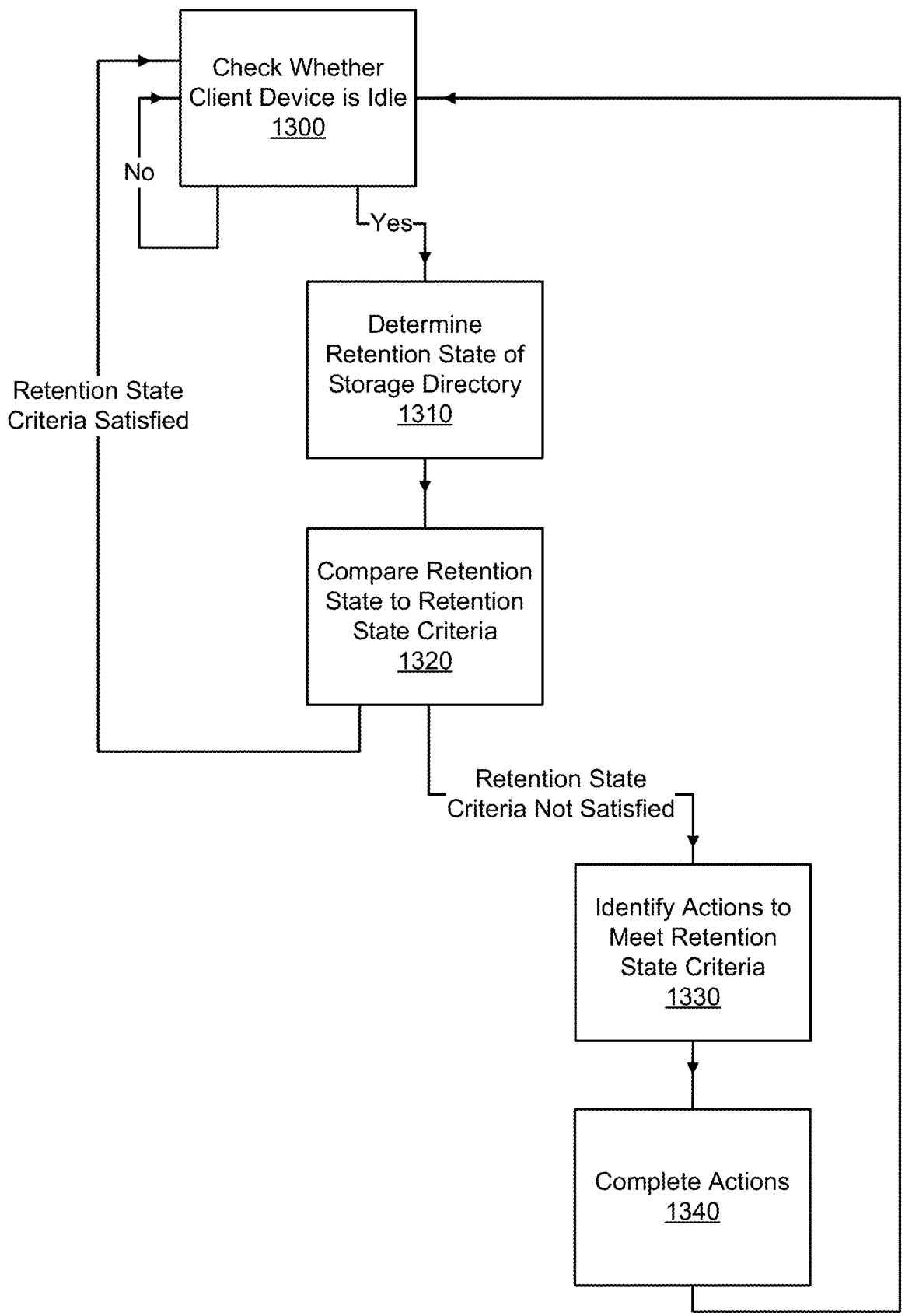
FIG. 13 is a flow diagram illustrating the process used in idle state triggered content management.

FIG. 13 is a flow diagram illustrating the function of idle state triggered constrained content management. First the system checks 1300 to determine whether a particular client device is idle. This step is completed either periodically or in response to the content storage directory reaching a predetermined threshold. If the device is idle, the system determines 1310, the retention state of the client device. Then the system compares the current retention state of the shared content storage directory to the retention state criteria for the shared content storage directory. If the criteria are satisfied by the current retention state of the shared content storage directory the system resumes checking 1300 to determine whether the client device is idle. If the retention state criteria are violated the system identifies 1330 actions to perform on the shared content storage directory that are required for the shared content storage directory to meet the retention state criteria. The system then performs 1340 those actions on the shared content storage directory to conform to the predetermined retention state criteria.

Synchronization of Placeholder Items Alongside Content Items

Figure 14:
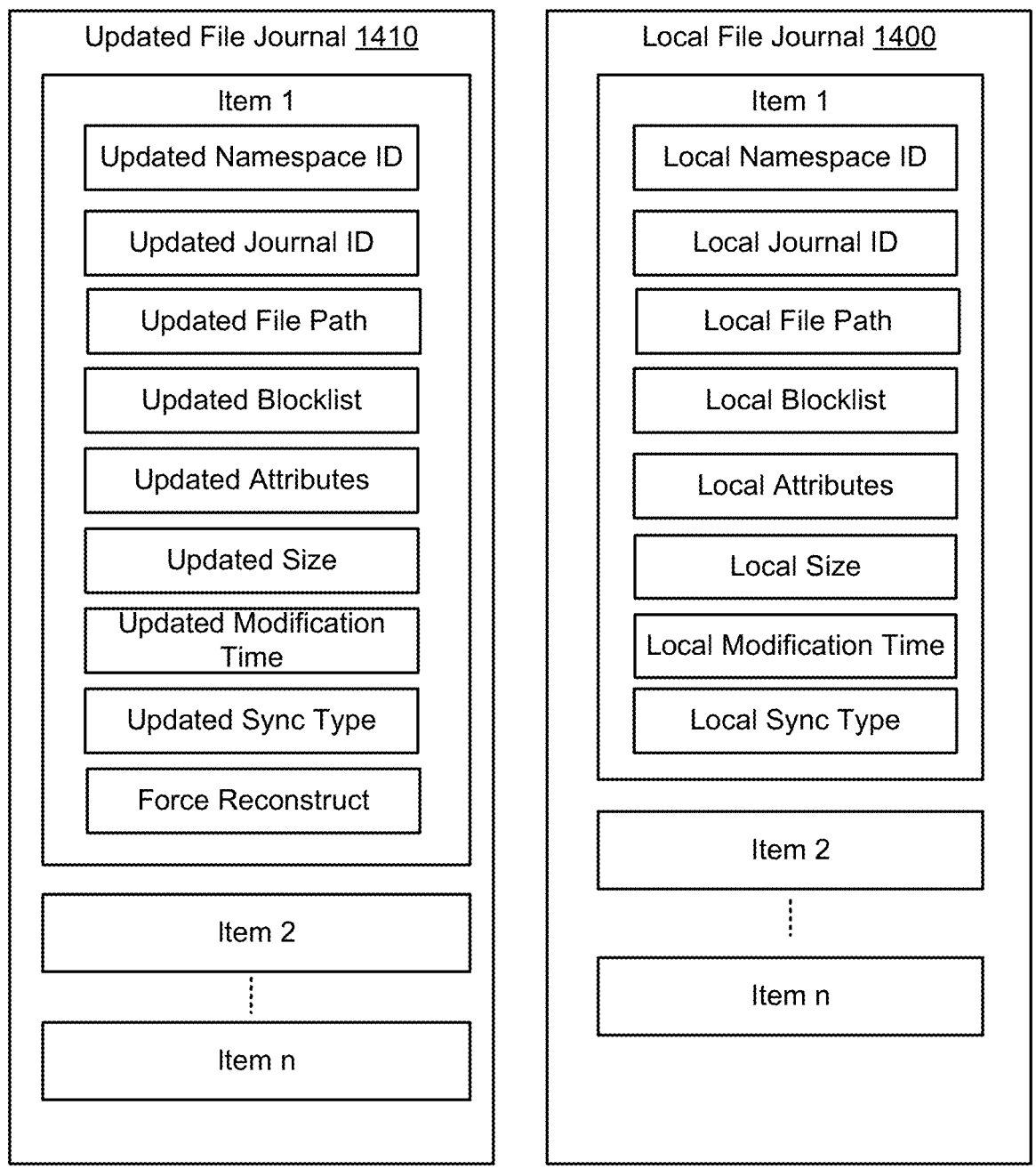
FIG. 14 is a block diagram illustrating the structure of the file journal in accordance with one embodiment.

FIG. 14 is a block diagram illustrating the structure of the file journal 360 in accordance with one embodiment. The file journal 360 contains an entry for each content item or placeholder item in the shared content storage directory of a client device. The file journal includes two sections, a local file journal 1400 and an updated file journal 1410. Each journal contains metadata for a list of file items (the listed items may include the same or different items). The local file journal 1400 contains the metadata of an item currently resident on the client device. The metadata may include a local namespace ID, a local journal ID, a local file path, a local blocklist, local extended attributes, local size, local modification time, and local sync type. Each version of an item is uniquely identified by a namespace ID and journal ID pair. Each field of the local file journal is described below:

Local Namespace ID: Metadata value indicating the namespace associated with the item.

Local Journal ID: Metadata value indicating the particular journal entry corresponding to a version of an item.

Local file path: Metadata value indicating the location of the item in the shared content storage directory.

Local blocklist: Metadata values indicating the blocks that comprise the item.

Local extended attributes: Metadata values including additional attributes of the item. These may include latest access time of the item, creation time of the item, or any other attributes.

Local size: Metadata values indicating the size of the item. If the item is classified as a placeholder item, the local size of the item is the size of the content represented by the placeholder item.

Local modification time: Metadata value indicating the time that the latest modification to the item occurred.

Local sync type: Metadata value indicating whether the item is a content item or a placeholder item.

The updated file journal 1410 is populated with updated metadata for items resident on the client device received from the content management system 110 or created by functions of the client application 200. If no updates for a particular item exist there will be no entry in the updated file journal for that item 1400. The updated metadata may include an updated namespace ID, an updated journal ID, an updated file path, an updated blocklist, updated extended attributes, an updated size, an updated modification time, an updated sync type, and a force reconstruct value.

The fields of an updated file journal entry, with the exception of the force reconstruct value, correspond to a local file journal entry. A difference between an entry in a local file journal entry and an updated file journal entry indicates that the content item associated with the entry has changed in some way. For example, if the updated file path differs from the local file path it indicates that the item associated with the entry (by the journal ID of the entry) has been moved from the local file path to the updated file path.

Committing Content Items to the Content Management System from a Client Device

Figure 15:
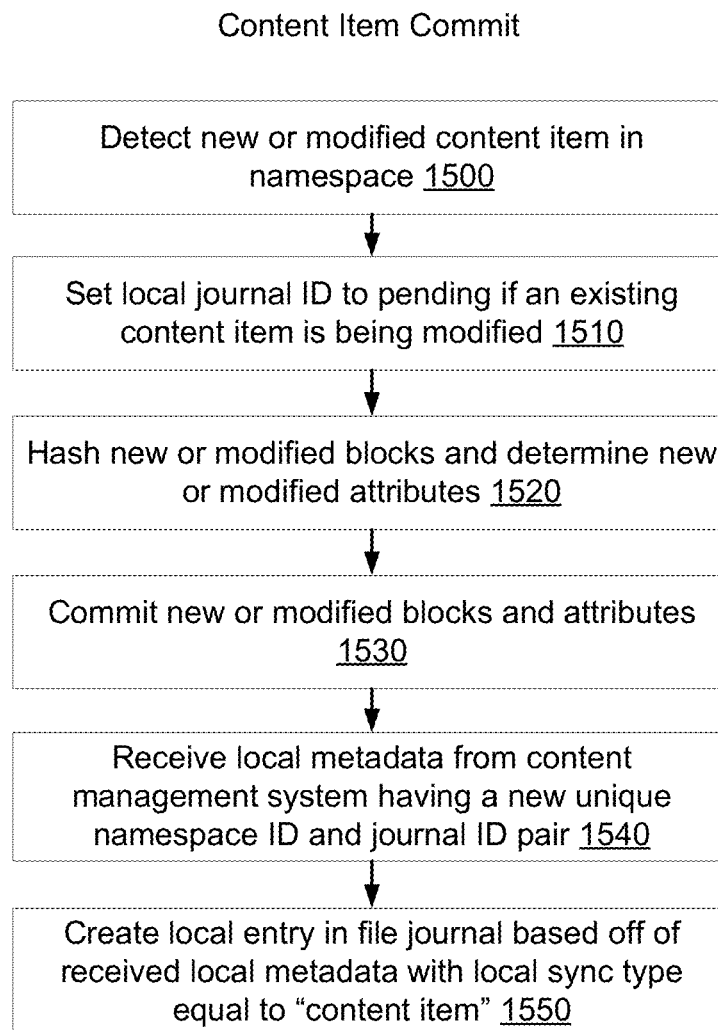
FIG. 15 is a flow diagram illustrating a detailed process for committing a content item in accordance with one embodiment.

FIG. 15 is a flow diagram illustrating one embodiment of an algorithm for committing a content item. The content synchronization module 310 detects 1500 a new or modified content item in the shared content storage directory 120. A modified content item indicates that one of the attributes of the content item has changed including at least one of the file path (or file name), blocklist, extended attributes, size, and latest modification time. If the content synchronization module 310 detects a modification to an existing content item as opposed to the creation of a new content item the local journal ID is set 1510 to a value (for example 0) that represents a pending state for that content item for the purposes of conflict resolution.

Once a new or modified content item is detected, the hashing module 320 hashes 1520 any new or modified data as new blocks to recreate a blocklist and determines any new or modified attributes of the content item. The blocklist and attributes of the new or modified content item are then committed 1530 to the content management system 110. The client devices then receives 1540, from the content management system 110, a set of local metadata for creating a new entry to the local file journal 1400 including a new journal ID on the namespace for the new or modified version of detected content item. The client device 100 creates 1550 a new local file journal entry based on the received metadata. The content management system 110 propagates updated entries to the updated file journal 1410 of other client devices 100 associated with the namespace of the new or modified content item based on associations in the namespace table 222. The algorithm for managing entries in the updated file journal 1410 are discussed with regard to FIG. 19 below.

Figure 16:
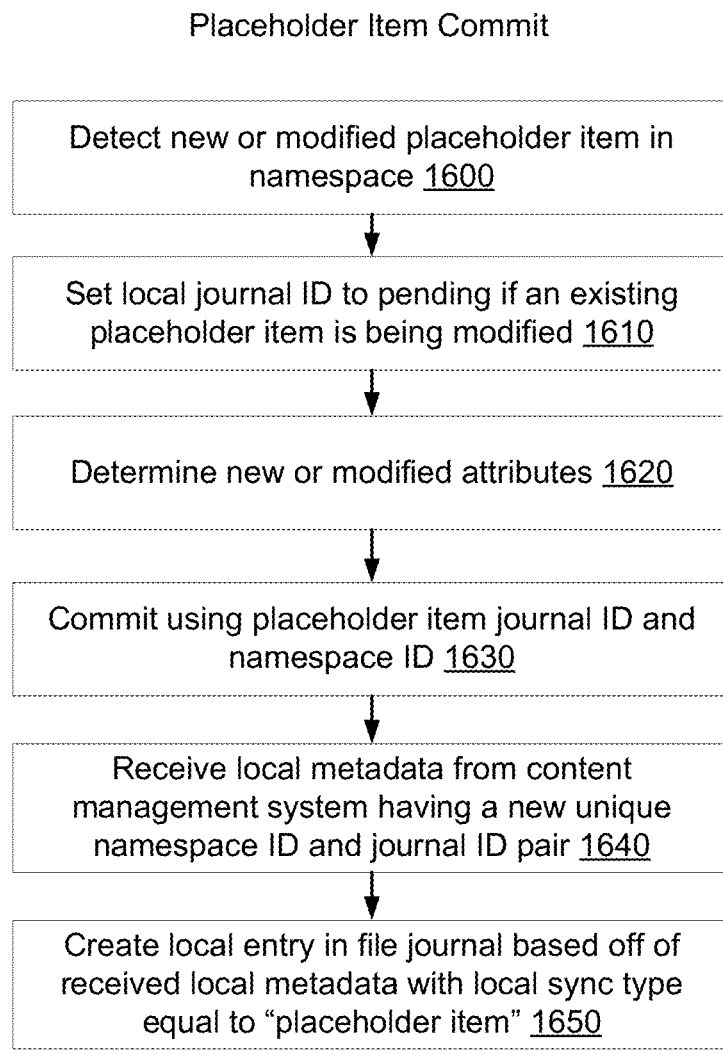
FIG. 16 is a flow diagram illustrating a detailed a process for committing a placeholder item in accordance with one embodiment.

Committing Placeholder Items to the Content Management System from a Client Device FIG. 16 is a flow diagram illustrating one embodiment of an algorithm for committing a placeholder item. The content synchronization module 310 detects 1600 a new or modified placeholder item on the in the shared content storage directory. A placeholder item may be a JSON dictionary or other representation having at least two fields including a namespace ID and a journal ID. The namespace and journal IDs stored in the placeholder item correspond to a local namespace ID and a local journal ID in the local file journal 1400. When a placeholder item is modified or created the corresponding local journal ID is set 1610 to a value (for example 0) that represents a pending state for the placeholder item for the purpose of conflict resolution.

The new or modified attributes of the placeholder item are determined 1620 by the content synchronization module 310. Modifications that might occur to a placeholder item include renaming a placeholder item, changing the file path of a placeholder item. Actions that may result in the creation of a new placeholder item may include copying a placeholder item or moving a content item from one namespace to another.

Once the new or modified attributes are determined by the content synchronization module 310, the journal ID and namespace ID of the placeholder item are used to commit 1630 the attributes of the placeholder item to the content management system 110. The client device then receives 1640, from the content management system 110, a set of local metadata for creating a new entry to the local file journal 1400 including a new journal ID on the namespace for the new or modified version of detected placeholder item. The client device 100 creates 1650 a new local file journal entry based on the received metadata. The placeholder item itself is also updated to reflect the new journal ID. Updated entries corresponding to the commit event are then propagated to other client devices 100 associated with the namespace of the new or modified placeholder item based on associations in the namespace table 222. An algorithm for managing entries in the updated file journal 1410 are discussed with regard to FIG. 19 below.

Replacing Content Items with Placeholder Items on a Client Device

Figure 17:
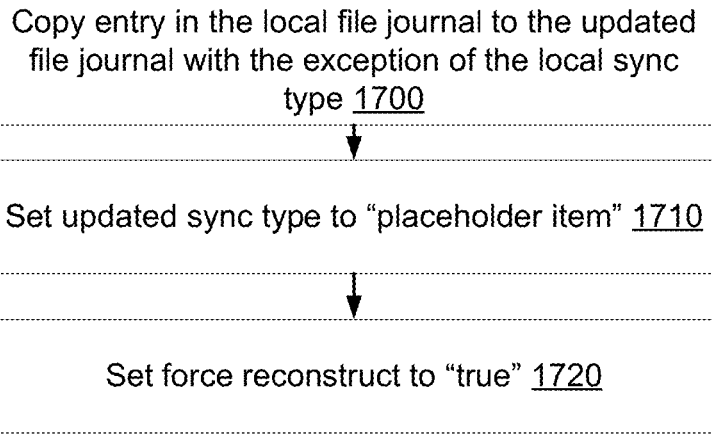
FIG. 17 is a flow diagram illustrating a detailed process for replacing a content item with a placeholder item in accordance with one embodiment.

A content item resident to a client device 100 may be marked to be replaced by a placeholder item. This may occur as either a direct user action or by determination of the client application 200 or the content management system 110 in accordance to one of the previously described methods for determining unattended content items. FIG. 17 is a flow diagram illustrating one embodiment of an algorithm for replacing a content item with a placeholder item. When a content item is identified for replacement with a representative placeholder item, the content synchronization module 310 copies 1700 the entry for the content item from the local file journal 1400 to the update file journal 1410 with the exception of the updated sync type field. The content synchronization module 310 sets 1710 the updated sync type field of entry to indicate a placeholder item. Subsequently, the force reconstruct field of the updated file journal entry is set to "true" indicating to the content synchronization module 310 that reconstruction of the content item is necessary despite the fact that the updated version of the content item has the same attributes as the original content item.

Replacing Placeholder Items with Content Items on a Client Device

Figure 18:
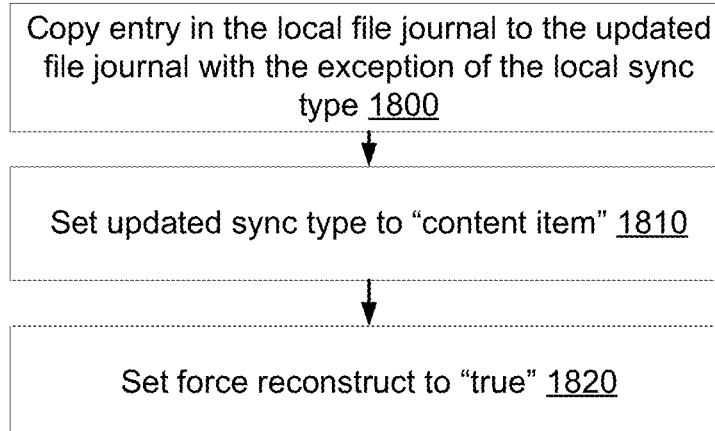
FIG. 18 is a flow diagram illustrating a detailed process for converting a placeholder item to a content item in accordance with one embodiment.

The process for replacing a placeholder item with the content item it represents is essentially the inverse of the process for replacing a content item with a representative placeholder item. A placeholder item representing a content item on a client device 100 may be marked to be restored to a content item. This may occur from either a direct user action or by determination of the client application 200 or the content management system 110 in accordance to one of the previously described methods for determining unattended content items. FIG. 18 is a flow diagram illustrating one embodiment of an algorithm for replacing a placeholder item with a content item. When a placeholder item is identified for restoration to a content item, the content synchronization module 310 copies 1800 the entry for the placeholder item from the local file journal 1400 to the update file journal 1410 with the exception of the updated sync type field. The content synchronization module 310 sets 1810 the updated sync type field of entry to indicate a content item. Subsequently, the force reconstruct field of the updated file journal entry is set to "true" indicating to the content synchronization module 310 that reconstruction of the placeholder item is necessary despite the fact that the updated entry for the placeholder has the same attributes as the local journal entry.

Update Function

Figure 19:
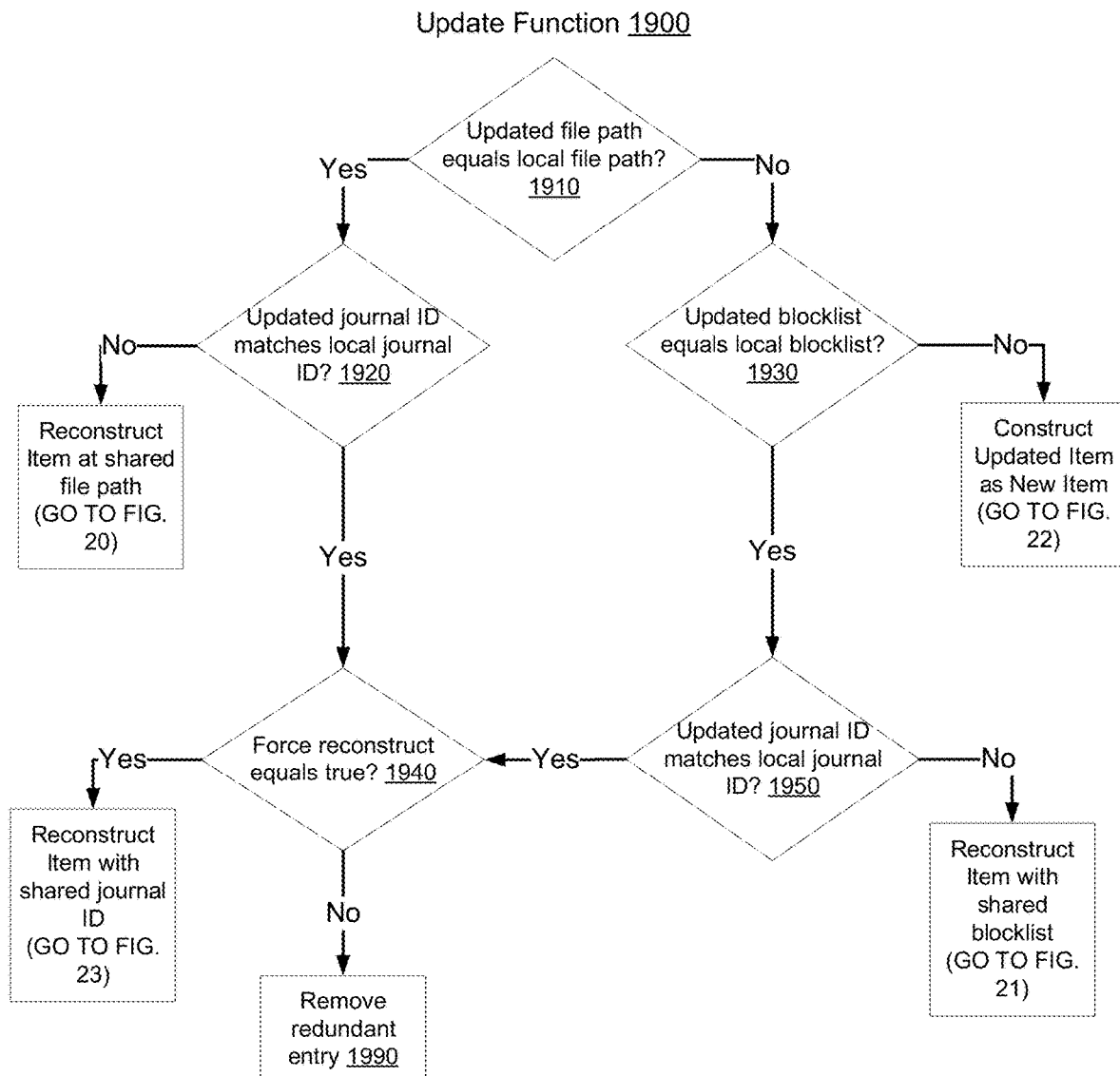
FIG. 19 is a flow diagram illustrating one example of an algorithm for the update function run by the content synchronization module upon receiving an update entry in the updated file journal.

FIG. 19 is a flow diagram illustrating one embodiment of an algorithm for the update function 1900 run by the content synchronization module 310 upon receiving an update entry in the updated file journal 1410. The update function 1900 is a series of steps performed by the content synchronization module 310 to determine what modifications need to be made to resolve the updated file journal entry that is either received from the content management system 110 or generated by the content synchronization module 310 itself. An updated journal may be created in a number of circumstances including but not limited to: when a new journal ID is created on the namespace based on a commit from a different client device associated with a namespace, when a content item resident on the client device is marked to be replaced (either by direct user action or by determination by the client application 200 or the content management system 110), and when a placeholder item representing a content item on a client device is marked to be replaced by its represented content item (either by direct user action or by determination of the client application or the content management system).

The content management system 110 creates a new journal ID when a new content item or version of a content item has been added to a namespace. When this occurs, the content management system 110 pushes metadata associated with the new content item or content item version from the metadata server 212 to client devices 100 associated with the namespace. When the transmitted metadata is received by the client device 100 the content synchronization module 310 saves the metadata as an entry in the updated file journal 1410. The updated sync type of the resultant entry may not be included in the transmitted metadata and may instead be determined by the client application 200 depending on the embodiment.

Upon saving the metadata as an entry in the updated file journal 1410 the update function 1900 performs the following steps in order to resolve the differences between the entry in the updated file journal 1410 (representing the modified or new version of an item) and the entries contained in the local file journal 1400. The update function first determines 1910 whether the update file path of the update file journal entry equals the local file path of any local journal entry stored on the client device 100. If there is a local journal entry that has the same file path, the update function then determines 1920 whether the item represented by the updated journal entry is a new version of the item located on the client device 100 by determining 1920 whether the updated journal ID of the updated entry matches the local journal ID of the local entry. If the updated journal ID does not match the local journal ID the content synchronization module 310 ascertains that a new version of the item represented by the local journal entry exists and initiates the process for reconstructing an item at a shared file path. This process is further described with reference to FIG. 20.

If instead, the content synchronization module 310 determines 1920 that the updated journal ID is equal to the local journal ID, the content synchronization module 310 determines 1940 whether the force reconstruct value is true for the updated entry. If the force reconstruct value is true the content synchronization module 310 initiates a process for reconstructing an item with a shared journal ID. This process is further described with reference to FIG. 23.

If the content synchronization module 310 determines 1940 that the force reconstruct value equals false then the updated journal entry is removed 1990 with no further action by the client application 200 as it is deemed a redundant update.

Returning to step 1910, the update function 1900 may also determine 1910 that the updated file path is not the same as any of the local file paths in the entries stored in the local file journal 1400. In this case, the content synchronization module 310 determines 1930 whether the updated blocklist of the updated entry matches and of the local blocklists in the local file journal 1400. If the updated blocklist is unique then the update function 1900 has determined that the updated entry indicates a new item and constructs the updated item as a new item according to the process further described with reference to FIG. 22.

If the content synchronization module 310 determines 1930 that the updated blocklist matches local blocklist in the local file journal 1400 then the content synchronization module determines 1950 whether the updated journal ID matches the local journal ID of the local entry having the matching blocklist. If the journal IDs do not match then the content synchronization module 310 reconstructs the item using a shared blocklist. This process is further described with reference FIG. 21.

If the content synchronization system instead determines 1950 that the updated journal ID matches the local journal ID from the local journal entry having a matching blocklist then the update function 1900 returns to step 1940 and proceeds as described above.

Reconstructing an Item at a Shared File Path

Figure 20:
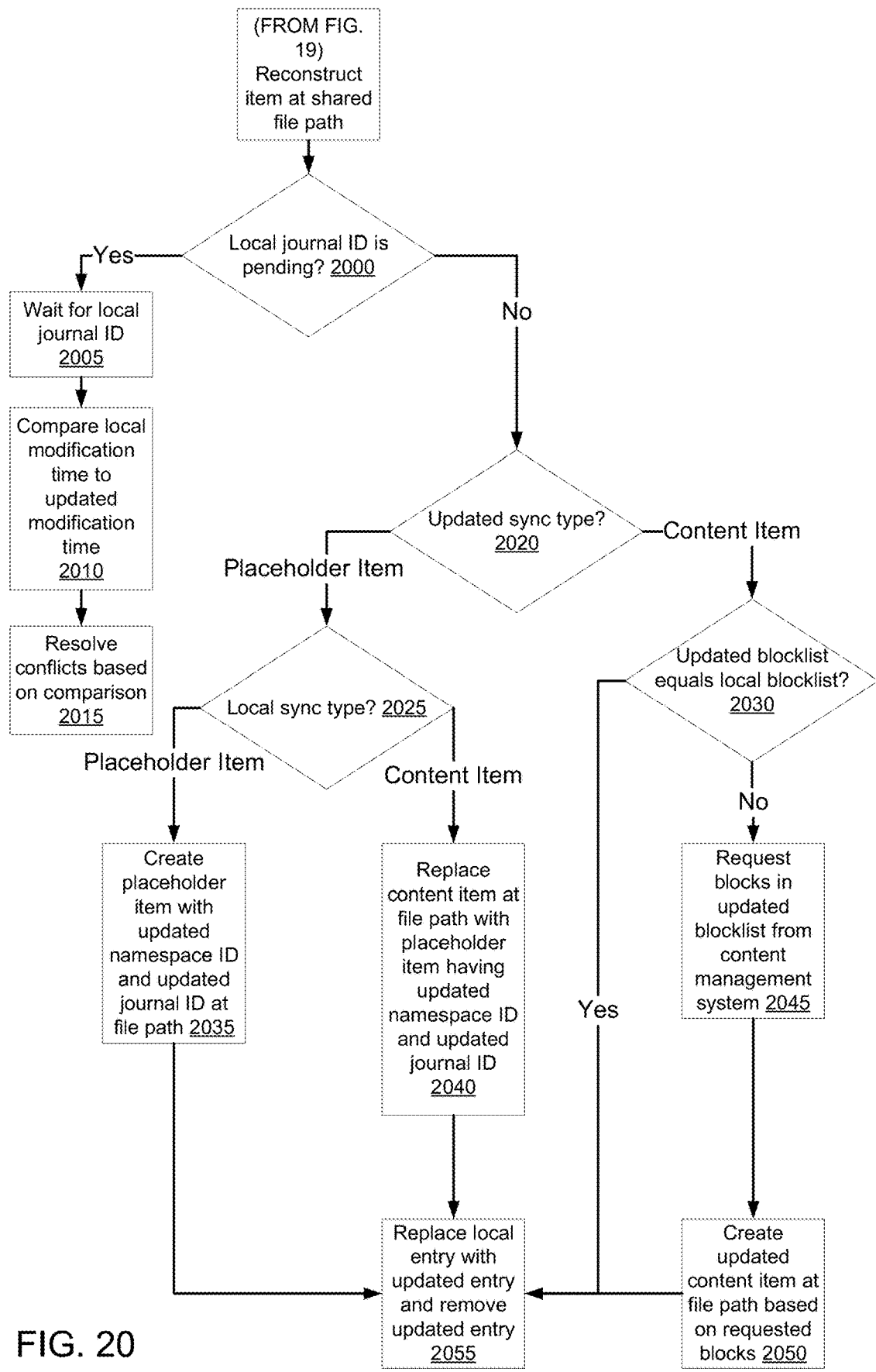
FIG. 20 is a flow diagram illustrating an algorithm for reconstructing an item at a shared file path in accordance with one embodiment.

FIG. 20 is a flow diagram illustrating one embodiment of an algorithm for reconstructing an item at a shared file path. The algorithm described by FIG. 20 occurs as a result of a negative determination in step 1920 of the update function 1900. Reconstructing an item at a shared file path occurs if a new version of a content item has been uploaded to the content management system 110 or if a content item is being converted to a placeholder item or vice versa while remaining at the same file path. The first step of the algorithm is to determine 2000 whether the local journal ID of the local file journal entry having the shared file path is pending, indicating that the content item corresponding to the local entry is currently being edited. If the corresponding local journal ID is pending the system waits 2005 for any further modifications to the content item to complete and for the local entry to receive a new local journal ID from the content management system 110. Upon receiving the new local journal ID the updated modification time of the updated entry and the new local modification time for the local entry are compared 2010 to determine, which modification was made more recently. Conflicts are resolved 2015 based on the comparison of the modification time and the particular edits made to the item. If during conflict resolution the same blocks that are listed in the updated blocklist are still relevant they will be downloaded and stored at the shared file path. If the conflict resolution process results in a different item than the final product of either the local or the updated changes then the item may have to be rehashed and a new blocklist generated per FIG. 15. If the local changes to the item supersede the changes made remotely (represented to the updated entry) then the updated entry may be discarded.

Returning to step 2000 the content synchronization module 310 may determine 2000 that the local journal ID of the local entry having the shared file path is not pending, thereby indicating that the item corresponding to the entry is not currently being edited. Based on this determination the content synchronization module 310 determines 2020 the whether the updated sync type is set to "placeholder item" or "content item." If the updated sync type indicates "content item" then the content synchronization module 310 checks to determine 2030 whether the updated blocklist is equal to the local blocklist of the local journal entry having the shared file path. If the two blocklists are equal the content synchronization module 310 need not download additional blocks from the content management system 110 and instead simply replaces the attributes of the local journal entry with those of the updated journal entry before removing the updated journal entry from the updated file journal 1410.

If the two blocklists are determined 2030 to be different, the content synchronization module 310 requests 2045 blocks in the updated blocklists from the content management system 110. Upon receiving the updated blocks, the content synchronization module 310 creates 2050 and updated content item at the shared file path based on the received blocks. Finally, the local journal entry is replaced 2055 with the updated journal entry before the updated entry is removed from the updated file journal 1410

Returning to step 2020, if the content synchronization module 310 determines 2020 that that the updated sync type indicates that the item should become a "placeholder item" then the content synchronization module 310 determines 2025 the local sync type of the item at the shared file path. If the local sync type indicates that the item is already a placeholder item, an updated placeholder item is created 2035 at the shared file path replacing the original placeholder item. The updated placeholder item includes metadata for the updated namespace ID and journal ID. After creating 2035 the updated placeholder item the local journal entry is replaced 2055 with the updated journal entry and the updated journal entry is removed from the updated file journal 1410.

Returning to step 2025, if the content synchronization module 310 determines that the local sync type is "content item" therefore representing a content item, the content synchronization system replaces 2040 the content item at the shared file path with a placeholder having an updated namespace and journal ID pair. After the content item has been replaced 2040 with a placeholder item, the content synchronization module 310 replaces 2055 the local journal entry with the updated journal entry and removes the updated journal entry from the updated file journal 1410.

Reconstructing an Item with a Shared Blocklist

Figure 21:
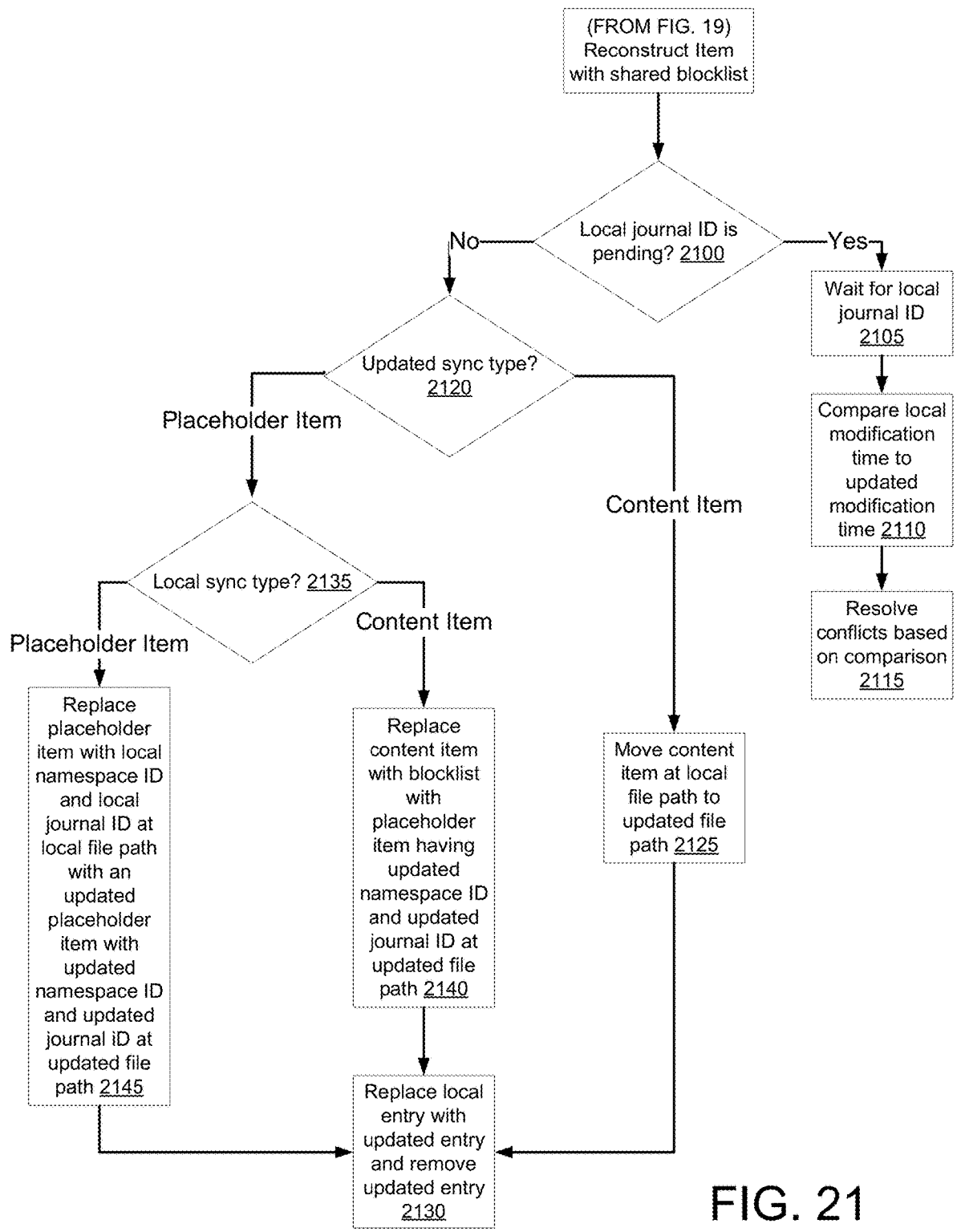
FIG. 21 is a flow diagram illustrating an algorithm for reconstructing an item with a shared blocklist in accordance with one embodiment.

FIG. 21 is a flow diagram illustrating one embodiment of an algorithm for reconstructing an item with a shared blocklist. The algorithm of FIG. 21 occurs as a result of a negative determination in step 1950 of update function 1900. The content synchronization module 310 reconstructs an item with a shared blocklist if an item is located at a different file path in the shared content storage directory but has the same blocklist as the updated blocklist. This situation may occur if an item has been moved from one file path to another.

First, the content synchronization module 310 determines 2100 if the local journal ID is pending. If the local journal ID is pending the content synchronization module 310 proceeds with the conflict resolution steps as previously described (shown with reference to FIG. 21 as 2105, 2110, and 2115 and in FIG. 20 as 2005, 2010, 2015). As a result of the conflict resolution, process, the content item corresponding the local journal entry having the shared blocklist may be moved to the updated file path, moved to a new local file path, or the content may be modified at the same time the item is moved to a new file path.

If the local journal ID is determined 2100 to not be pending, then the content synchronization module 310 determines 2120 the updated sync type of the updated entry. If the updated sync type indicates that the updated item should be a "content item" then the content item having the shared blocklist is moved 2125 from the local file path to the updated file path indicated in the updated journal entry. The content synchronization module 310 then replaces 2130 the local journal entry with the updated journal entry and removes the updated journal entry from the updated file journal 1410.

Returning to step 2120, if the content synchronization module 310 determines 2120 that the updated sync type specifies that the updated item is a placeholder item, the content synchronization module 310 determines 2135 the local sync type. If the local sync type is "content item" then the content item corresponding to the local entry and having the shared blocklist is replaced 2140 with a placeholder item having the updated namespace ID and journal ID pair. The placeholder item is then moved to the location indicated by the updated file path. Upon replacing the content item with the placeholder item, the content synchronization module 310 replaces 2130 the local journal entry with the updated journal entry and removes the updated journal entry from the updated file journal 1410.

If the local sync type is determine 2135 to be a placeholder item the local placeholder item having the local namespace ID and journal ID pair is replaced 2145 with an updated placeholder item having the updated namespace ID and journal ID pair. The content synchronization module then saves the updated placeholder item to the updated file path. Upon replacing 2145 the local placeholder item with the updated placeholder item and relocating the placeholder item to the new file path, the content synchronization module 310 replaces 2130 the local journal entry with the updated journal entry and removes the updated journal entry from the updated file journal 1410.

Constructing an Updated Item as a New Item

Figure 22:
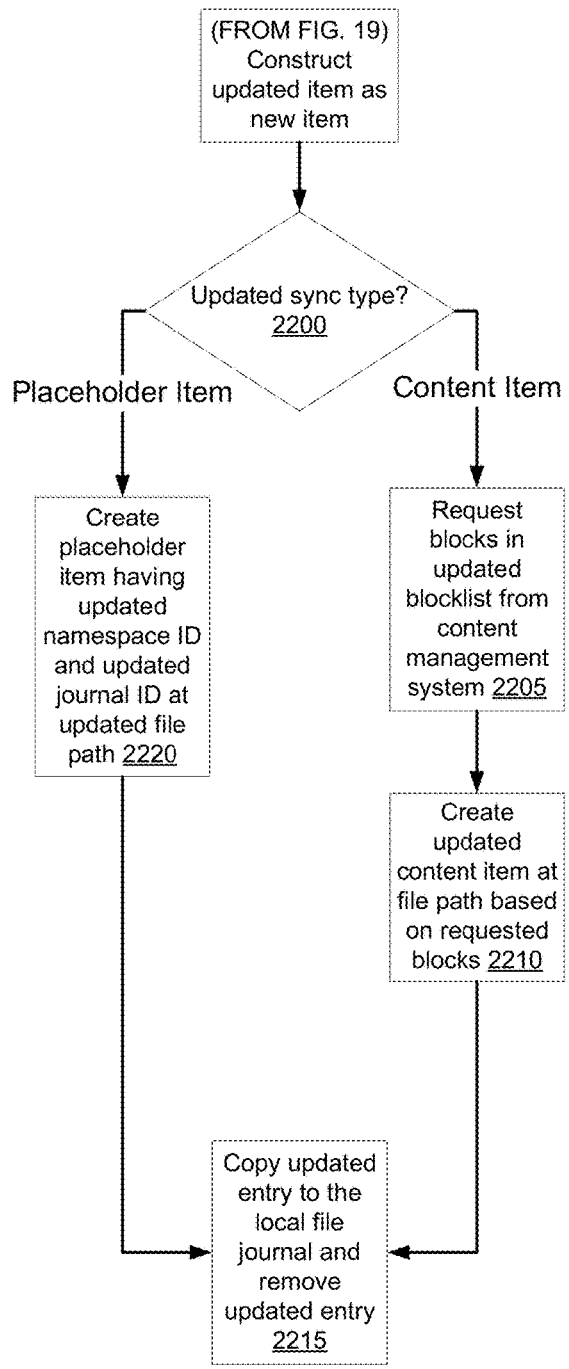
FIG. 22 is a flow diagram illustrating an algorithm for constructing an updated item as a new item in accordance with one embodiment.

FIG. 22 is a flow diagram illustrating one embodiment of an algorithm for constructing an updated item as a new item. The algorithm of FIG. 22 occurs as a result of a negative determination in step 1930 of the update function 1900. The content synchronization module 310 constructs an updated item as a new item when no entry in the local file journal 1400 has a local file path or a local blocklist that matches the updated file path or the updated blocklist of the updated entry.

When constructing a new item the content synchronization module 310 first determines 2200 the updated sync type for the updated item. If the updated sync type is for a placeholder item, the content synchronization module 310 creates 2220 a placeholder item having the updated namespace ID and updated journal ID pair at the updated file path. The updated entry is then copied 2215 to the local file journal 1400 and the updated entry is removed from the updated file journal 1410.

If the content synchronization module 310 determines 2200 that the updated sync type indicates that the updated item is a content item, then the content synchronization module 310 requests 2205 the blocks specified by the updated blocklist from the content management system 110. Upon receiving the requested blocks, the content synchronization module 310 creates 2210 an updated content item at the updated file path using the requested blocks. Once the content item has been created, the updated entry is then copied 2215 to the local file journal 1400 and the updated entry is removed from the updated file journal 1410.

Reconstructing an Item with a Shared Journal ID

Figure 23:
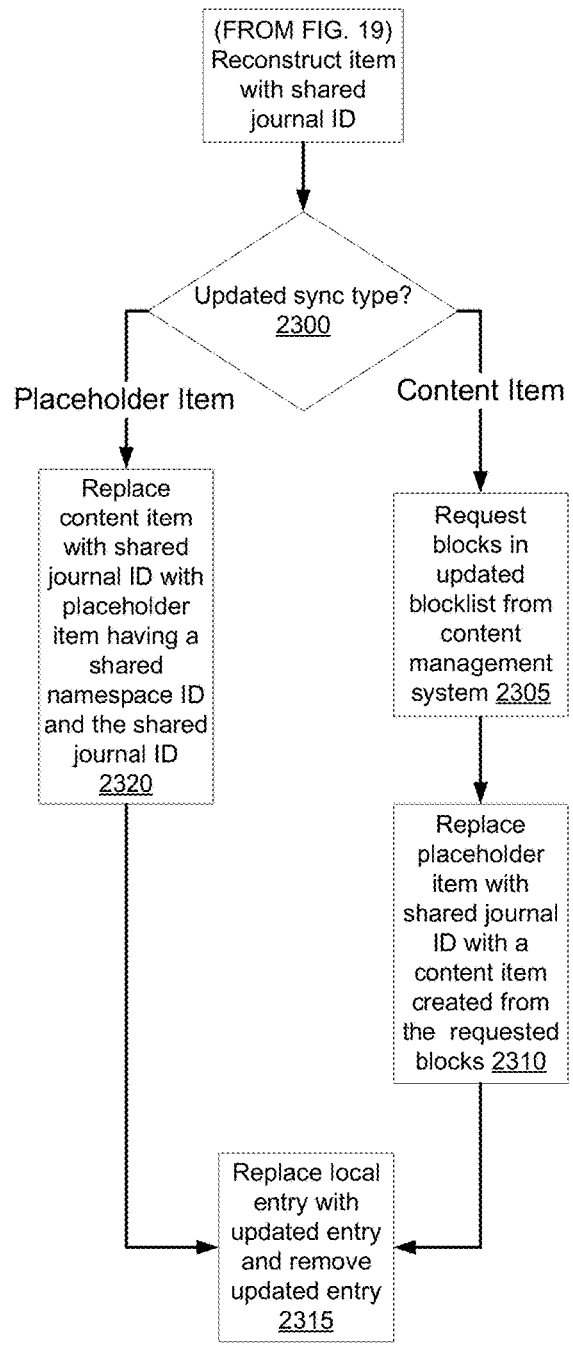
FIG. 23 is a flow diagram illustrating an algorithm for reconstructing an item with a shared journal ID in accordance with one embodiment.

FIG. 23 is a flow diagram illustrating one embodiment of an algorithm for reconstructing an item with a shared journal ID. The algorithm described by FIG. 23 occurs as a result of a positive determination in step 1940 of the update function 1900. Reconstructing an item with a shared journal ID occurs when the force reconstruct value is identified as "true." This means that an item in the shared content storage directory is being converted from a content item to a placeholder item or vice versa, in which case the updated journal entry has been created by the content synchronization module 310 itself.

First the content synchronization module 310 determines 2300 the updated sync type indicated by the updated entry. If the updated sync type indicates a placeholder item, the content synchronization module 310 replaces 2320 the content item corresponding to the local journal entry having the shared journal ID with a placeholder item that includes the shared namespace ID journal ID pair. Upon replacement 2320 of the content item with the placeholder item, the local entry in the local file journal 1400 is then replaced 2315 with the updated entry and the updated entry is removed from the updated file journal 1410.

If the content synchronization module 310 instead determines 2300 that the updated sync type indicates a content item, the content synchronization module 310 requests 2305 blocks in the updated blocklist from the content management system 110. Upon receipt of the requested blocks, the content synchronization module 310 replaces 2310 the placeholder item corresponding to the local journal entry having the shared journal ID with a content item created from the requested blocks. Upon replacement 2320 of the placeholder item with the content item, the local entry in the local file journal 1400 is then replaced 2315 with the updated entry and the updated entry is removed from the updated file journal 1410.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   storing, by a client device, a plurality of synchronized items including placeholder items and content items, each of the synchronized items having corresponding metadata indicating a local sync type;
   receiving, by the client device, data comprising a plurality of fields, a field of the plurality of fields indicating an updated sync type for a given synchronized item, the updated sync type selected from a plurality of candidate discrete predefined values for the field, the plurality of candidate discrete predefined values for the field comprising a first predefined value indicating that a new version of the given synchronized item is a placeholder item and a second predefined value indicating that the new version of the given synchronized item is a content item, the local sync type for the given synchronized item indicating that the given synchronized item is a placeholder item;
   responsive to receiving the updated sync type, determining whether the updated sync type indicates that the new version of the given synchronized item is a content item instead of a placeholder item; and
   responsive to determining that the updated sync type indicates that the new version of the given synchronized item is a content item instead of a placeholder item, replacing, in the client device, the placeholder item with the content item.

2. The method of claim 1, further comprising calculating a retention score for the given synchronized item, the retention score indicative of a likelihood that the given synchronized item will be accessed.

3. The method of claim 2, wherein the retention score is an access frequency score proportionate to a number of accesses to the given synchronized item within a predetermined time period.

4. The method of claim 2, wherein the retention score is a location related access score based on a weighted combination of at least one of:
- a latest access time of the given synchronized item and a latest access time of a co-located synchronized item, and
- an access frequency of the given synchronized item and an access frequency of the co-located synchronized item.

5. The method of claim 2, wherein the retention score is a similar access score based on a weighted combination of at least one of a latest access time of the given synchronized item, an access frequency of the given synchronized item, a latest access time of a similar synchronized item, or an access frequency of the similar synchronized item.

6. The method of claim 2, wherein the retention score is a criteria based retention score based on a number of predictive criteria satisfied by the given synchronized item, the predictive criteria comprising at least one of a latest access time, a location, a type, a size, an access frequency, a shared status, a number of accounts with access, a number of devices with access, or a number of devices storing the given synchronized item.

7. The method of claim 1, wherein the updated sync type indicates that the new version of the given synchronized item is the placeholder item when a retention score of the given synchronized item is at or below a threshold or the content item when the retention score of the given synchronized item is above the threshold.

8. The method of claim 1, wherein an entry of metadata is stored at the client device for each of the plurality of synchronized content items, and wherein receiving the updated sync type for the given synchronized item comprises receiving an updated entry from a content management system, the updated entry representing a new version of the given synchronized item and including the updated sync type for the given synchronized item.

9. A method comprising:
- storing, by a client device, a plurality of synchronized items including placeholder items and content items, each of the synchronized items having corresponding metadata indicating a local sync type;
- receiving, by the client device, data comprising a plurality of fields, a field of the plurality of fields indicating an updated sync type for a given synchronized item, the updated sync type selected from a plurality of candidate discrete predefined values for the field, the plurality of discrete candidate predefined values for the field comprising a first predefined value indicating that a new version of the given synchronized item is a placeholder item and a second predefined value indicating that the new version of the given synchronized item is a content item, the local sync type for the given synchronized item indicating that the given synchronized item is a content item;
- responsive to receiving the updated sync type, determining whether the updated sync type indicates that the new version of the given synchronized item is a placeholder item instead of a content item; and
- responsive to determining that the updated sync type indicates that the new version of the given synchronized item is a placeholder item instead of a content item, replacing, in the client device, the content item with the placeholder item.

10. The method of claim 9, calculating a retention score for the given synchronized item is indicative of a likelihood that the given synchronized item will be accessed.

11. The method of claim 10, wherein the retention score is an access frequency score proportionate to a number of accesses to the given synchronized item within a predetermined time period.

12. The method of claim 10, wherein the retention score is a location related access score based on a weighted combination of at least one of a latest access time of the given synchronized item, an access frequency of the given synchronized item, a latest access time of a co-located synchronized item, or an access frequency of the co-located synchronized item.

13. The method of claim 10, wherein the retention score is a similar access score based on a weighted combination of at least one of a latest access time of the given synchronized item, an access frequency of the given synchronized item, a latest access time of a similar synchronized item, or an access frequency of the similar synchronized item.

14. The method of claim 10, wherein the retention score is a criteria based retention score based on a number of predictive criteria satisfied by the given synchronized item, the predictive criteria comprising at least one of a latest access time, a location, a type, a size, an access frequency, a shared status, a number of accounts with access, a number of devices with access, or a number of devices storing the given synchronized item.

15. The method of claim 9, wherein the updated sync type indicates that the new version of the given synchronized item is the placeholder item when a retention score of the given synchronized item is at or below a threshold or the content item when the retention score of the given synchronized item is above the threshold.

16. A non-transitory computer readable storage medium storing executable instructions that, when executed by one or more processors, cause the one or more processors to perform operations comprising:
- storing a plurality of synchronized items including placeholder items and content items, each of the synchronized items having corresponding metadata indicating a local sync type;
- receiving data comprising a plurality of fields, a field of the plurality of fields indicating an updated sync type for a given synchronized item, the updated sync type selected from a plurality of discrete candidate predefined values for the field, the plurality of candidate discrete predefined values for the field comprising a first predefined value indicating that a new version of the given synchronized item is a placeholder item and a second predefined value indicating that the new version of the given synchronized item is a content item, the local sync type for the given synchronized item indicating that the given synchronized item is a placeholder item;
- responsive to receiving the updated sync type, determining whether the updated sync type indicates that the new version of the given synchronized item is a content item instead of a placeholder item; and
- responsive to determining that the updated sync type indicates that the new version of the given synchronized item is a content item instead of a placeholder item, replacing the placeholder item with the content item.

17. The non-transitory computer readable storage medium of claim 16, wherein the operations further comprise calculating a retention score for the given synchronized item, the retention score indicative of a likelihood that the given synchronized item will be accessed.

18. The non-transitory computer readable storage medium of claim 16, wherein the retention score is an access frequency score proportionate to a number of accesses to the given synchronized item within a predetermined time period.

19. The non-transitory computer readable storage medium of claim 16, wherein the updated sync type indicates that the new version of the given synchronized item is the placeholder item when a retention score of the given synchronized item is at or below a threshold or the content item when the retention score of the given synchronized item is above the threshold.

20. The non-transitory computer readable storage medium of claim 16, wherein an entry of metadata is stored at the client device for each of the plurality of synchronized content items, and wherein receiving the updated sync type for the given synchronized item comprises receiving an updated entry from a content management system, the updated entry representing a new version of the given synchronized item and including the updated sync type for the given synchronized item.

* * * * *